US011938073B2

United States Patent

(12) United States Patent
Gigstad

(10) Patent No.: US 11,938,073 B2
(45) Date of Patent: Mar. 26, 2024

(54) DEVICES FOR ASSISTING LIMB MOVEMENT

(71) Applicant: GIGSTRIDE CORPORATION, Tucson, AZ (US)

(72) Inventor: Gavin W. Gigstad, Tucson, AZ (US)

(73) Assignee: GIGSTRIDE CORPORATION, Tucson, AZ (US)

( * ) Notice: Subject to any disclaimer, the term of this patent is extended or adjusted under 35 U.S.C. 154(b) by 0 days.

(21) Appl. No.: 18/464,743

(22) Filed: Sep. 11, 2023

(65) Prior Publication Data

US 2023/0414438 A1 Dec. 28, 2023

Related U.S. Application Data

(63) Continuation-in-part of application No. 18/297,560, filed on Apr. 7, 2023.

(60) Provisional application No. 63/329,002, filed on Apr. 8, 2022.

(51) Int. Cl.

| | |
|---|---|
| ***A61H 3/00*** | (2006.01) |
| ***A61H 1/02*** | (2006.01) |
| ***A61H 3/04*** | (2006.01) |
| ***A63B 3/00*** | (2006.01) |

(52) U.S. Cl.

CPC ............ *A61H 1/0262* (2013.01); *A61H 3/04* (2013.01); *A63B 3/00* (2013.01); *A61H 2003/007* (2013.01); *A61H 2201/0192* (2013.01); *A61H 2201/1261* (2013.01); *A61H 2201/14* (2013.01); *A61H 2201/1642* (2013.01); *A61H 2201/165* (2013.01); *A61H 2201/1664* (2013.01)

(58) Field of Classification Search

CPC .. A61H 1/0262; A61H 3/04; A61H 2003/007; A61H 2201/0192; A61H 2201/1261; A61H 2201/14; A61H 2201/1642; A61H 2201/165; A61H 2201/1664; A61H 2201/0157; A61H 2201/1253; A61H 2203/0406; A61H 2205/10; A63B 3/00

See application file for complete search history.

(56) References Cited

U.S. PATENT DOCUMENTS

| | | | | | |
|---|---|---|---|---|---|
| 6,361,517 | B1 * | 3/2002 | Slinger | A61F 5/0113 | 482/79 |
| 2009/0107533 | A1 * | 4/2009 | Nativ | A61H 3/04 | 482/124 |
| 2010/0270771 | A1 * | 10/2010 | Kobayashi | A61H 1/0255 | 280/210 |
| 2018/0177673 | A1 * | 6/2018 | Talton | A61H 3/04 | |
| 2021/0371026 | A1 * | 12/2021 | Haimes | B60R 9/10 | |

* cited by examiner

*Primary Examiner* — Quang D Thanh
(74) *Attorney, Agent, or Firm* — NGUYEN TARBET LLC

(57) ABSTRACT

A limb assistance device for assisting in the movement of a lower limb of a user. The limb assistance devices can attach to or be integrated with a stability aid (e.g., a walker or parallel bars). The devices may include an adaptor bracket configured to attach to the stability aid, an elastic cord coupled to the adaptor bracket, and an adjustment component attached to the elastic cord. Moving the stability aid (e.g., the walker) may cause the attachment component to pull the shoe of the user along with the stability aid.

16 Claims, 25 Drawing Sheets

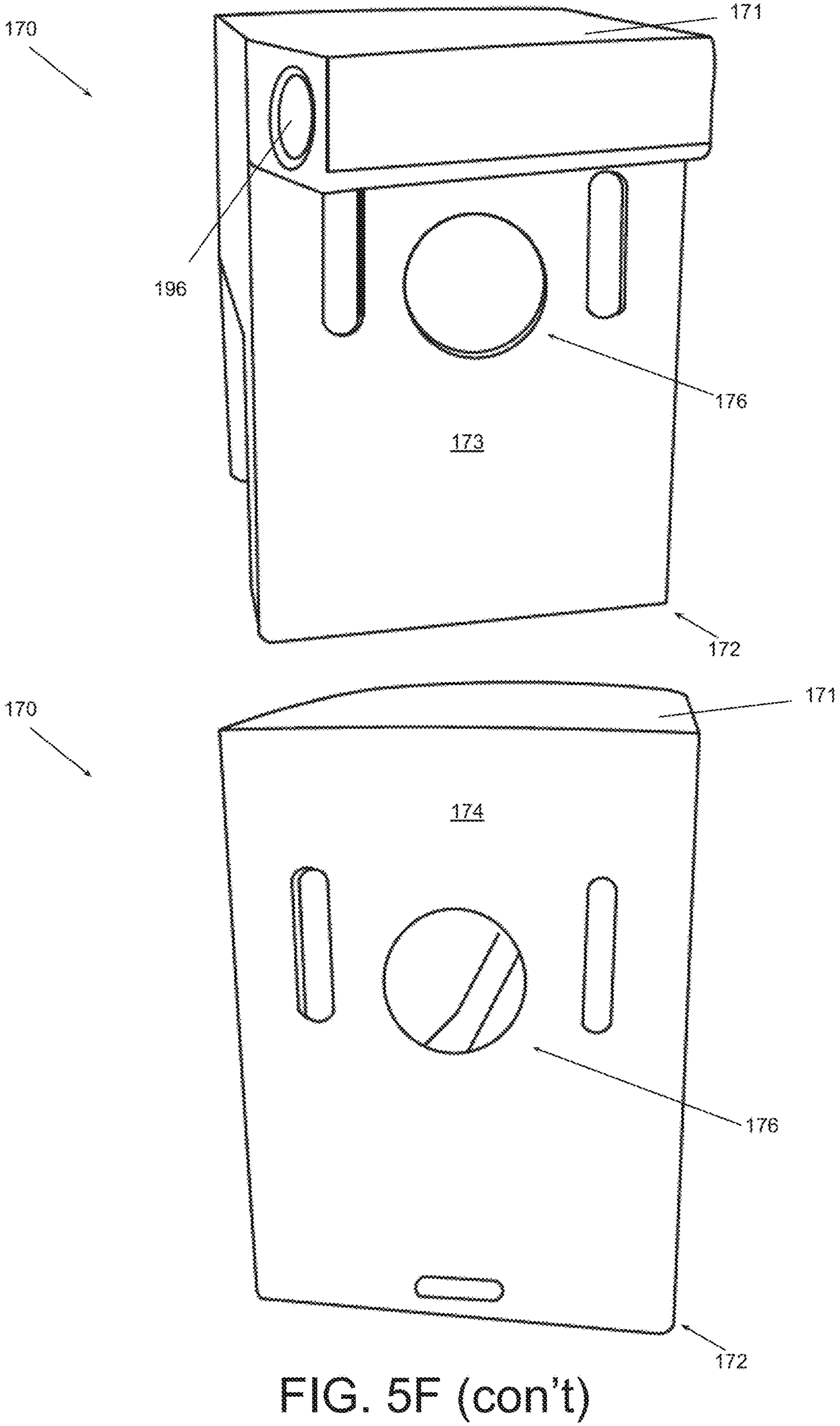
FIG. 5F (con't)

DEVICES FOR ASSISTING LIMB MOVEMENT

CROSS-REFERENCES TO RELATED APPLICATIONS

This application is a continuation-in-part and claims benefit of U.S. patent application Ser. No. 18/297,560 filed Apr. 7, 2023, which is a non-provisional and claims benefit of U.S. Provisional Application No. 63/329,002 filed Apr. 8, 2022, the specifications of which are incorporated herein in their entirety by reference.

FIELD OF THE INVENTION

The present invention is directed to a limb assistance device that assists in the movement of lower limbs through the use of a supportive elastic cord.

BACKGROUND OF THE INVENTION

People who experience difficulty in moving their legs due to prior accidents, injuries, weakness, surgery, or degenerative disease, lesions, peripheral nervous system disorders, central nervous system disorders (e.g., a limp from multiple sclerosis or a stroke) may require specialized assistive devices or stability aids to help them in walking on their own. Some of these assistive devices comprise canes, walkers, wheelchairs, and parallel bars that allow for direct and simple assistance in terms of balance and movement. While assistive devices aid a user's movement, some users may require additional support to move their leg to take a step. Certain people may implement a brace or splint in conjunction with an assistive device to this end, but this can only provide so much additional support and may not be enough for certain users to be able to move their legs in the ways that they need. Thus, there is a need for assistive devices that can work with a walker while also allowing for additional support to limbs through functional and consistent movement patterns, improving mobility, and promoting neuromuscular reeducation.

BRIEF SUMMARY OF THE INVENTION

It is an objective of the present invention to provide devices that allow for a front wheel walker or parallel bars to assist in the movement of legs through the use of a supportive cord, as specified in the independent claims. Embodiments of the invention are given in the dependent claims. Embodiments of the present invention can be freely combined with each other if they are not mutually exclusive.

The present invention features a limb assistance device for assisting in the movement of a lower limb (e.g., a foot and/or leg) of a user. The present invention may also feature a limb assistance system comprising a limb assistance device as described herein and a stability aid (e.g., a walker or parallel bars) to which the limb assistance device is attached thereto.

The attachment component may be configured to secure the user. Moving the walker may cause the attachment component to be pulled by the elastic cord, generating tension, and stabilizing the walker after movement may release the tension such that the shoe or other piece of footwear of the user can be assisted in functional movement along with the walker. In some embodiments, the elastic cord may be connected to the stability aid (e.g., walker). In other embodiments, the elastic cord may be clipped to the walker. In some embodiments, the attachment component may comprise a clip, fastener, or loop. The loop may comprise a velcro strap or may be a component of the elastic cord.

In some embodiments, the present invention features limb assistance devices for assisting in the movement of lower limbs. The device may comprise one or more adaptor brackets configured to be attached to a stability aid; an elastic cord coupled to the one or more adaptor brackets; and an intermediate component attached to the elastic cord, wherein the intermediate component allows for the adjustment of the elastic cord to compensate for a gait pattern of a user; wherein the elastic cord comprises an attachment component for attaching the limb assisting device to the user (e.g., to a shoe, boot, brace, or foot of the user)

In some embodiments, the present invention may also feature a limb assistance system comprising a limb assistance device as described herein, and a stability aid to which the limb assistance device is attached thereto. In some embodiments, the stability aid is a walker, and one or more adaptor brackets are attached to the walker. In other embodiments, the present invention may also feature a limb assistance system comprising a limb assistance device as described herein, a pair of parallel bars, and a coupling system for connecting the limb assistance device (100) to the parallel bars.

One of the unique and inventive technical features of the present invention is the implementation of an elastic cord in or on a stability aid such as a walker or parallel bars. Without wishing to limit the invention to any theory or mechanism, it is believed that the technical feature of the present invention advantageously provides additional limb support to users by generating the movement of limbs along with the movement of the stability aid. None of the presently known prior references or work has the unique, inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIGS. 1A-1D shows the limb assistance device as described herein attached to a stability aid (e.g., a walker). FIGS. 1A and 1B shows a limb assistance device for attachment to a single foot of a user. FIG. 1C shows a limb assistance device for attachment to both feet of a user. FIG. 1D shows a limb assistance device for attachment to one or both feet of a user.

DETAILED DESCRIPTION OF THE INVENTION

Figure 1A:
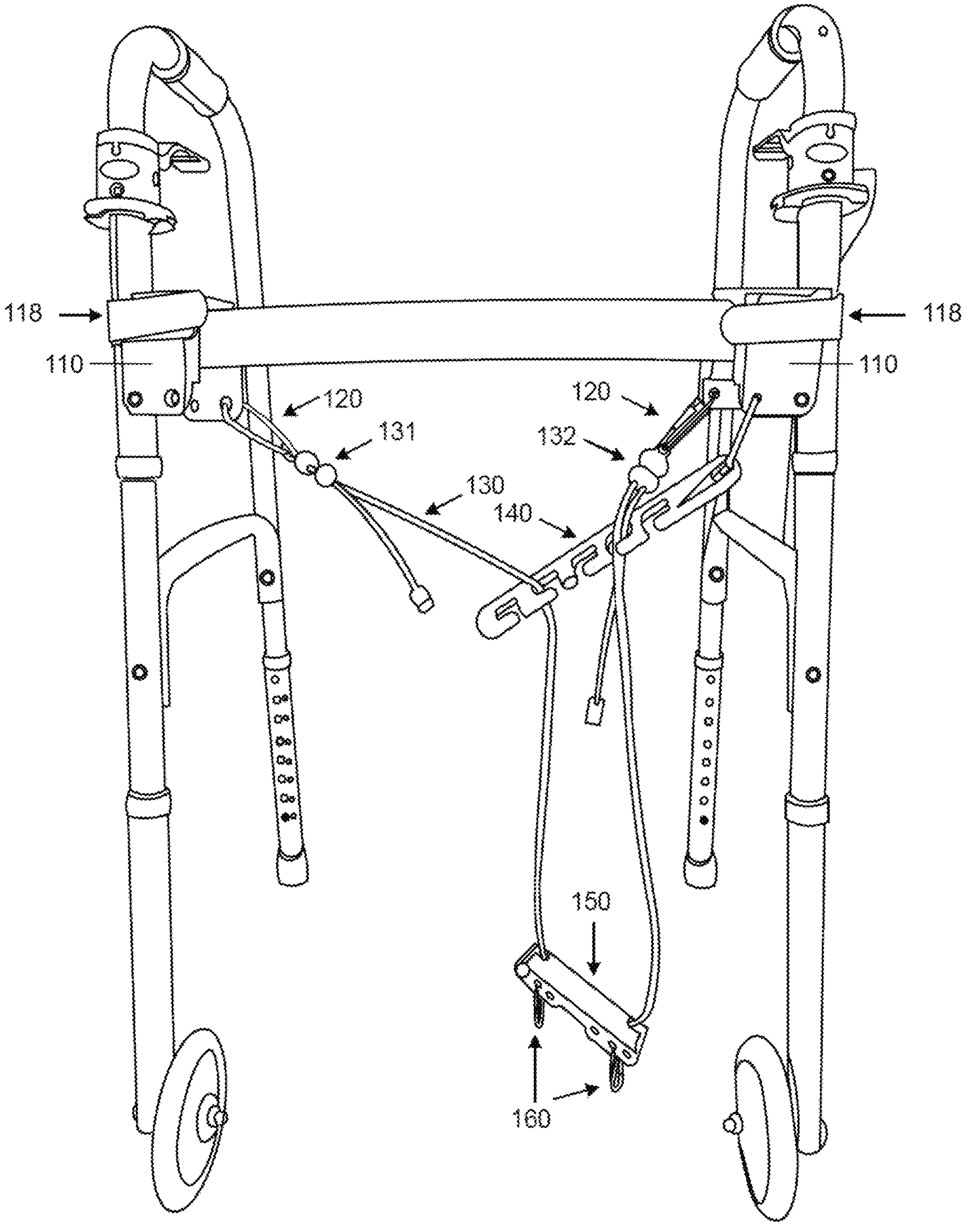
Figure 1B:
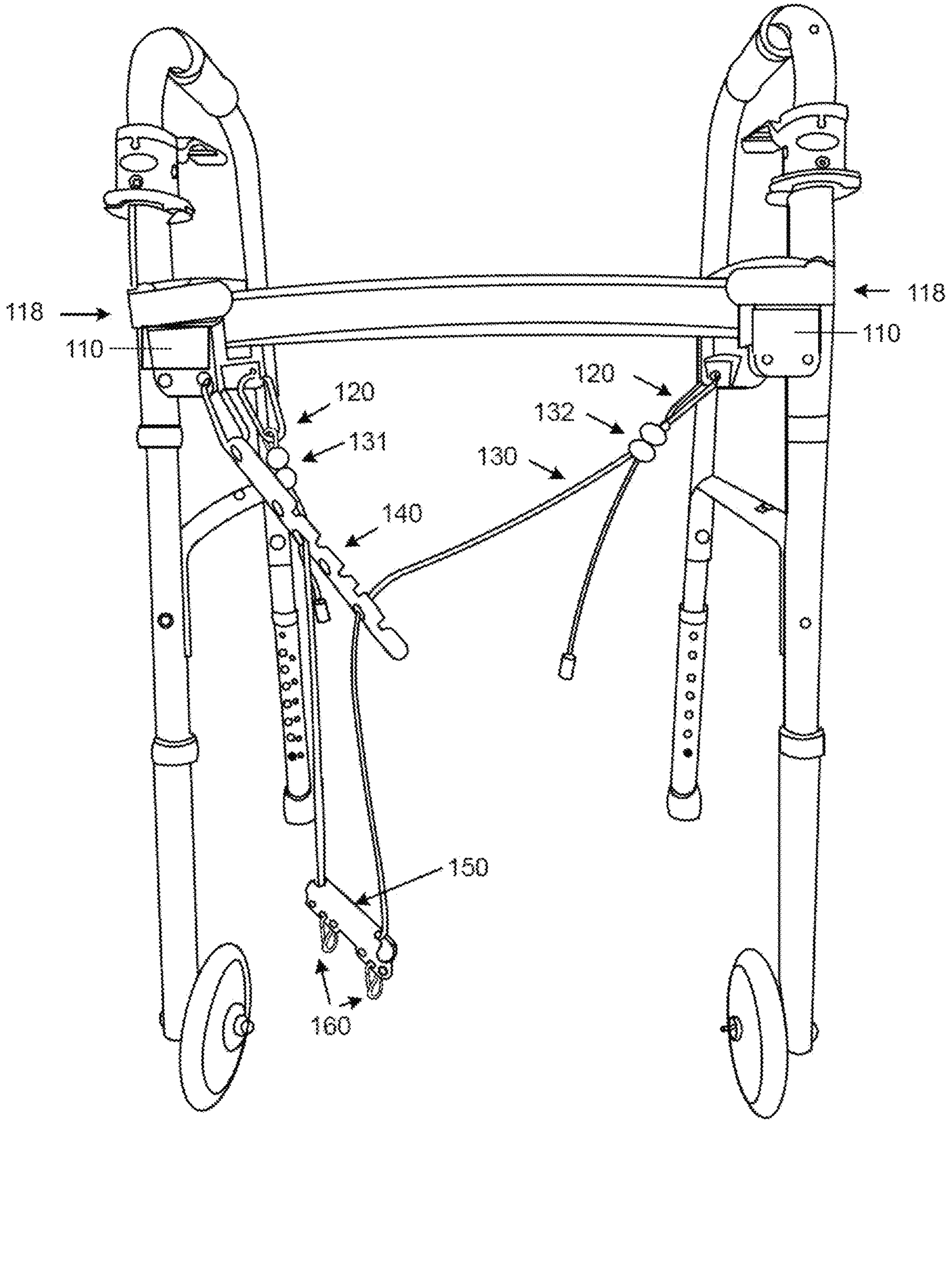
Figure 1C:
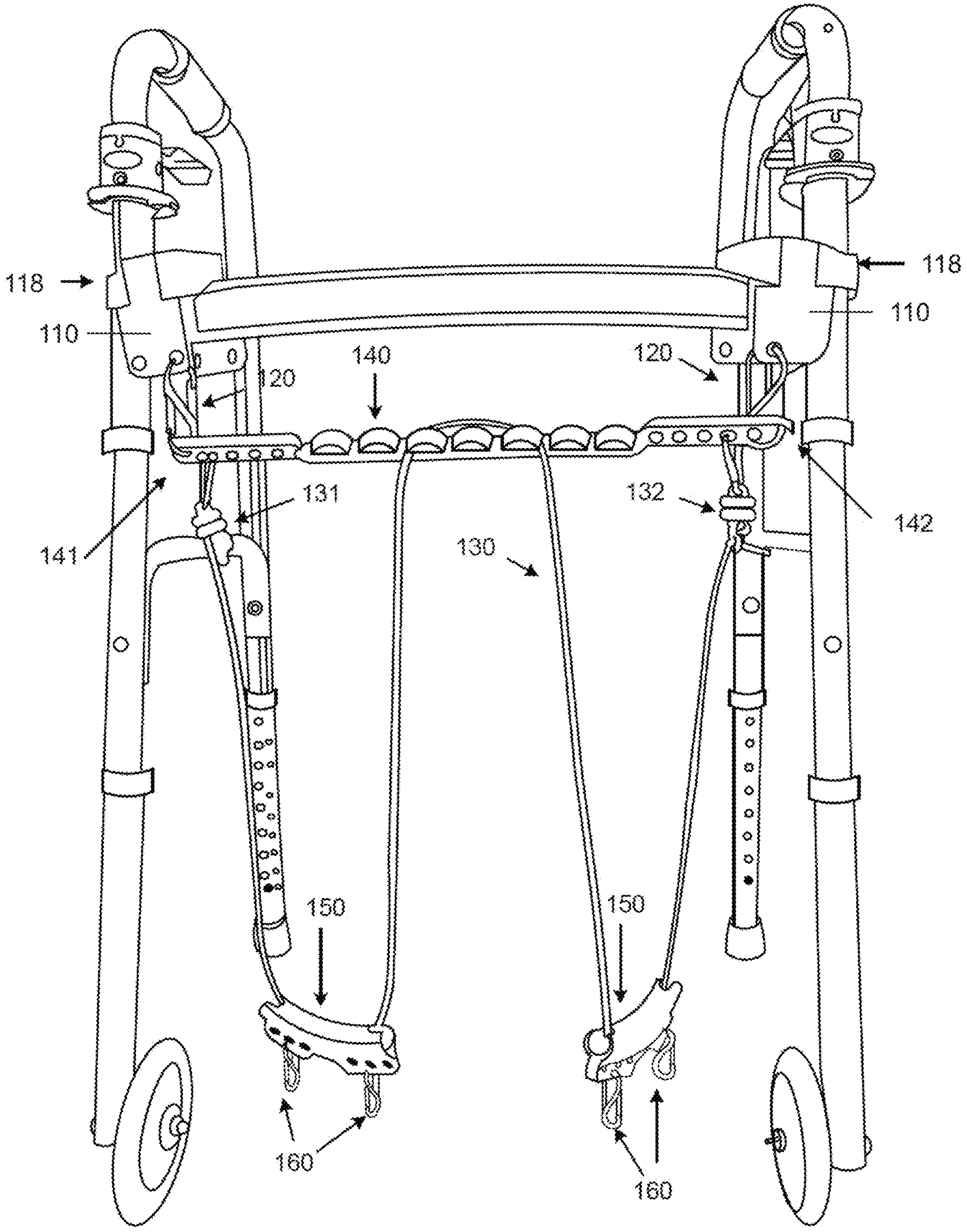
Figure 1D:
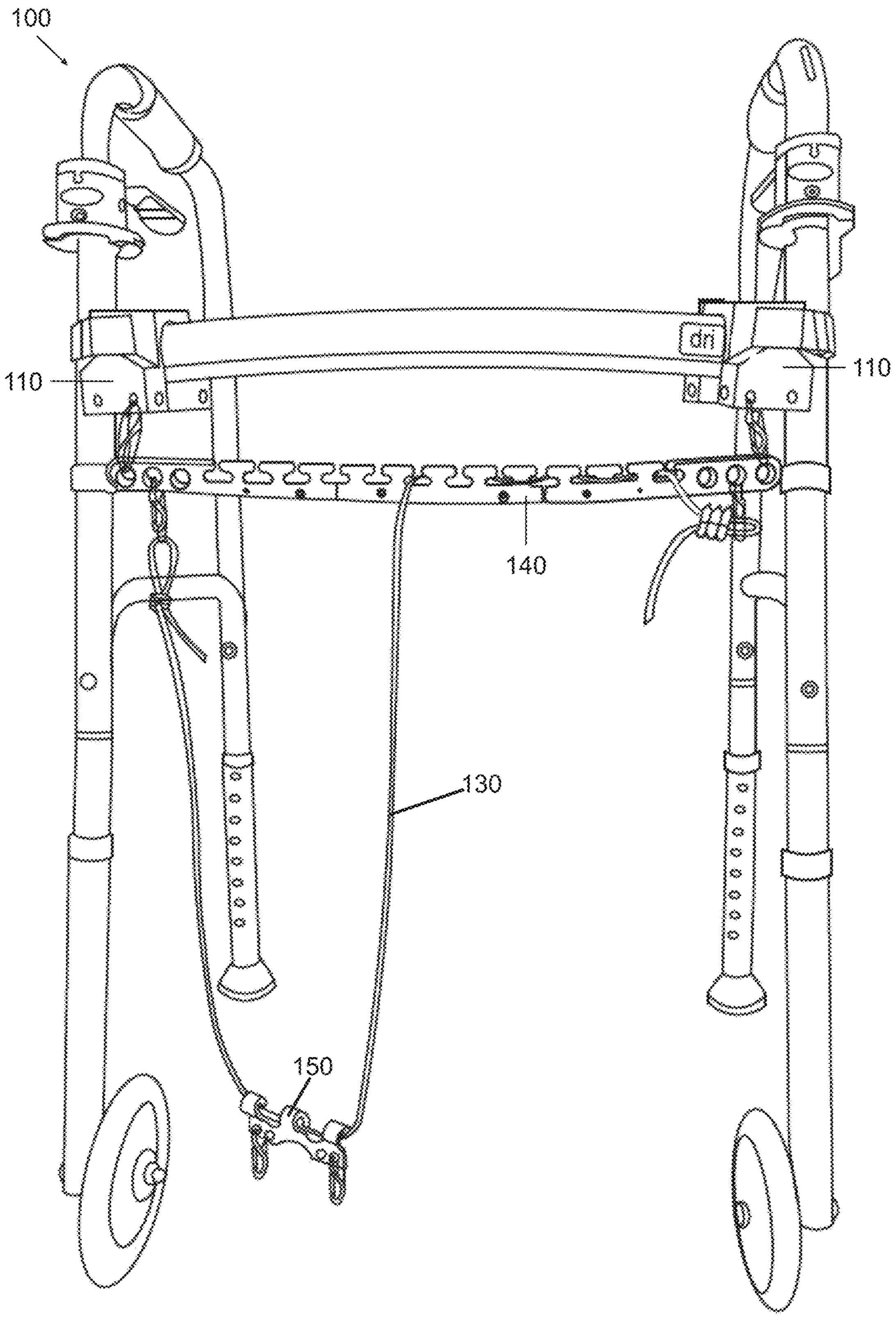

Following is a list of elements corresponding to a particular element referred to herein:

100 Limb Assistance Device
110 Adaptor Bracket
111 First Side of Adaptor Bracket
112 Second Side of Adaptor Bracket
113 Third Side of Adaptor Bracket
114 Fourth Side of Adaptor Bracket
115 Fifth Side of Adaptor Bracket
116 Sixth Side of Adaptor Bracket
117 Concave Surface
118 Bracket Attachment Component
120 Connector Component
130 Elastic Cord
131 First End of Elastic Cord
132 Second End of Elastic Cord
140 Intermediate Component
141 First End of Intermediate Component
142 Second End of Intermediate Component
145 Notches
150 Reciprocating Component
151 First End of Reciprocating Component
152 Second End of Reciprocating Component
155 Hook Component
160 Attachment Component
170 Glider Bracket
171 First Side of Glider Bracket
172 Second Side of Glider Bracket
173 Third Side of Glider Bracket
174 Fourth Side of Glider Bracket
176 Cavity
177 Concave Surface
180 Pole Component
190 Spacer Component
196 Cavity Limb Assistance Device:

Referring to FIG. 1A-1D, the present invention features a limb assistance device (100) for assisting in the movement of a lower limb (e.g., a leg and/or a foot). The limb assistance device (100) may comprise an adaptor bracket (110) attached to a stability aid, an elastic cord (130) coupled to the adaptor bracket (110), and an intermediate component (140) attached to the elastic cord (130). The intermediate component (140) allows for the adjustment of the elastic cord (130) to compensate for a gait pattern of a user. In some embodiments, the elastic cord (130) comprises an attachment component (160) for attaching the limb assistance device (100) to the user (e.g., to a user's foot or shoe).

In some embodiments, the present invention features a limb assistance device (100) for assisting in the movement of a lower limb (e.g., a leg and/or a foot). The limb assistance device (100) may comprise one or more adaptor brackets (110) attached to a stability aid, an elastic cord (130) coupled to the one or more adaptor brackets adaptor bracket (110), and an intermediate component (140) attached to the elastic cord (130). The intermediate component (140) allows for the adjustment of the elastic cord (130) to compensate for a gait pattern of a user. In some embodiments, the elastic cord (130) comprises an attachment component (160) for attaching the limb assistance device (100) to the user (e.g., to a user's foot or shoe).

Figure 2A:
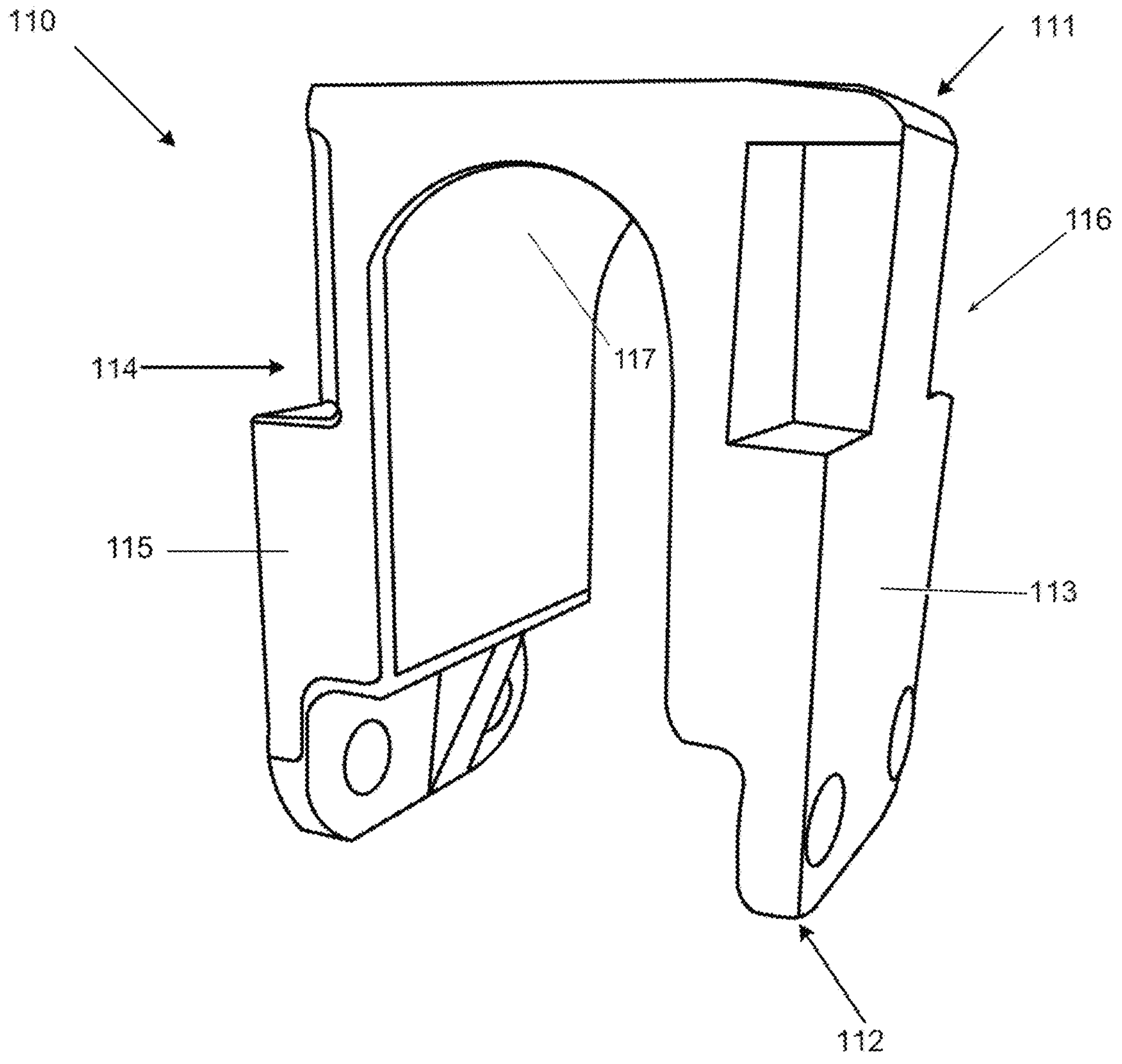
FIGS. 2A and 2B shows various embodiments of an adaptor bracket described herein.
Figure 2B:
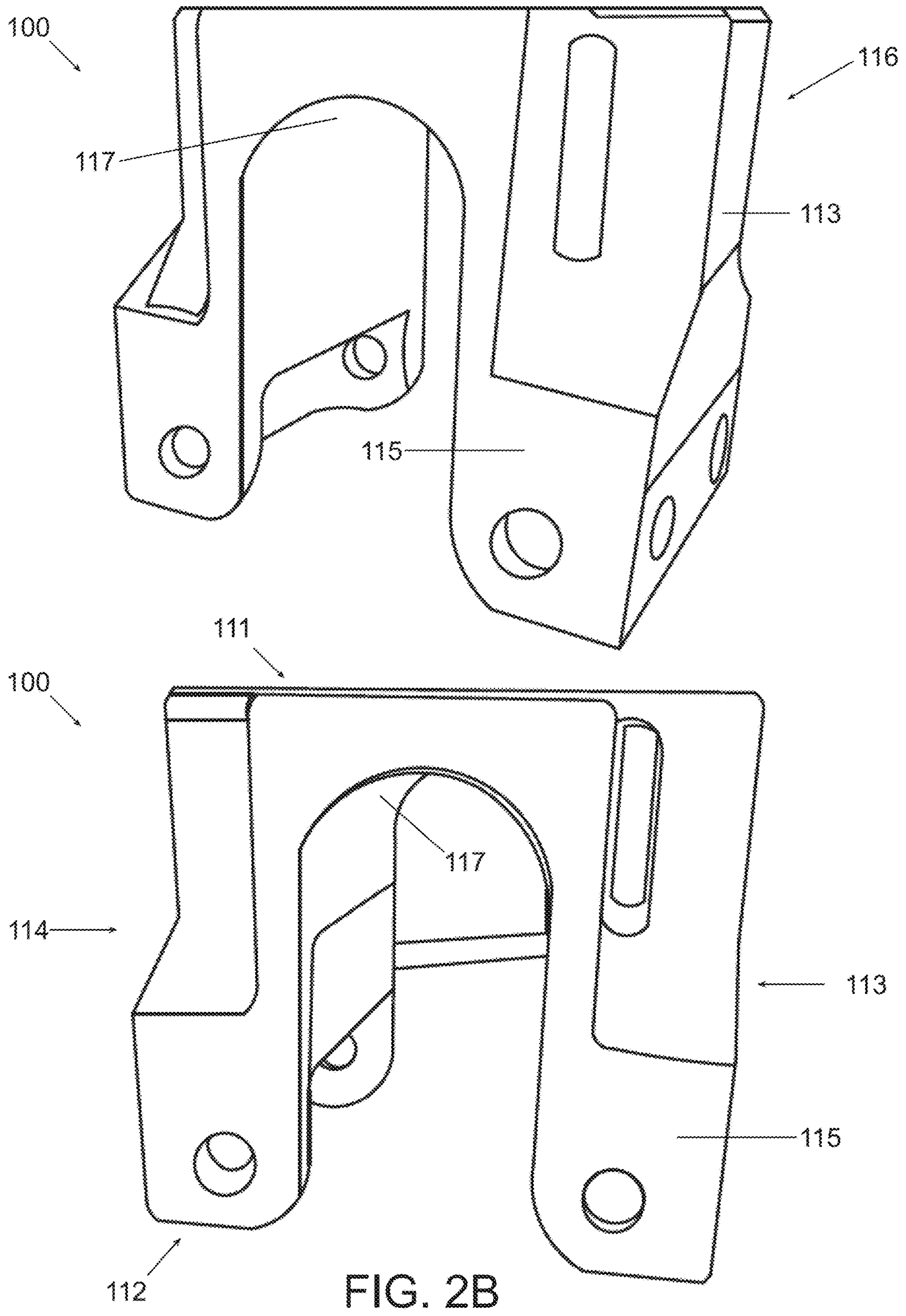
Figure 3A:
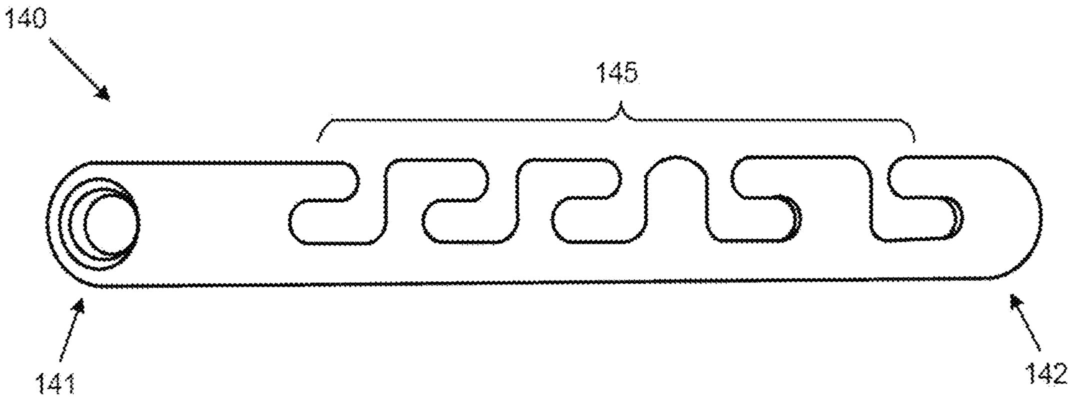
FIG. 3A-3D show varying embodiments of an intermediate component comprising a plurality of notches.
Figure 3B:
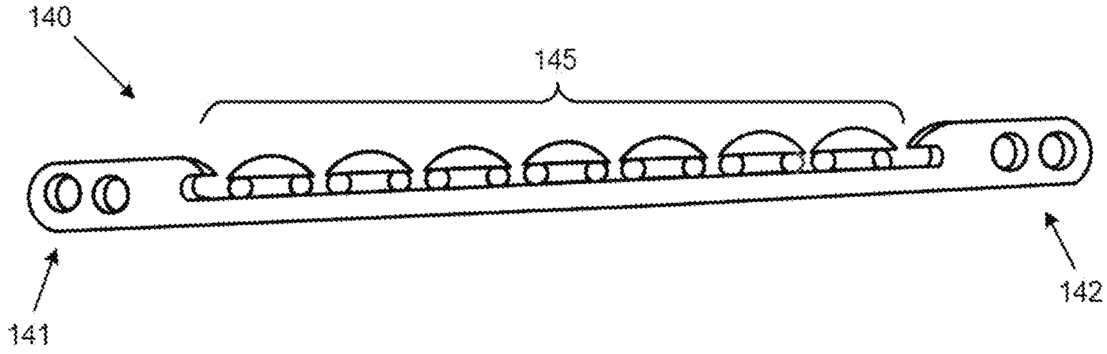
Figure 3C:
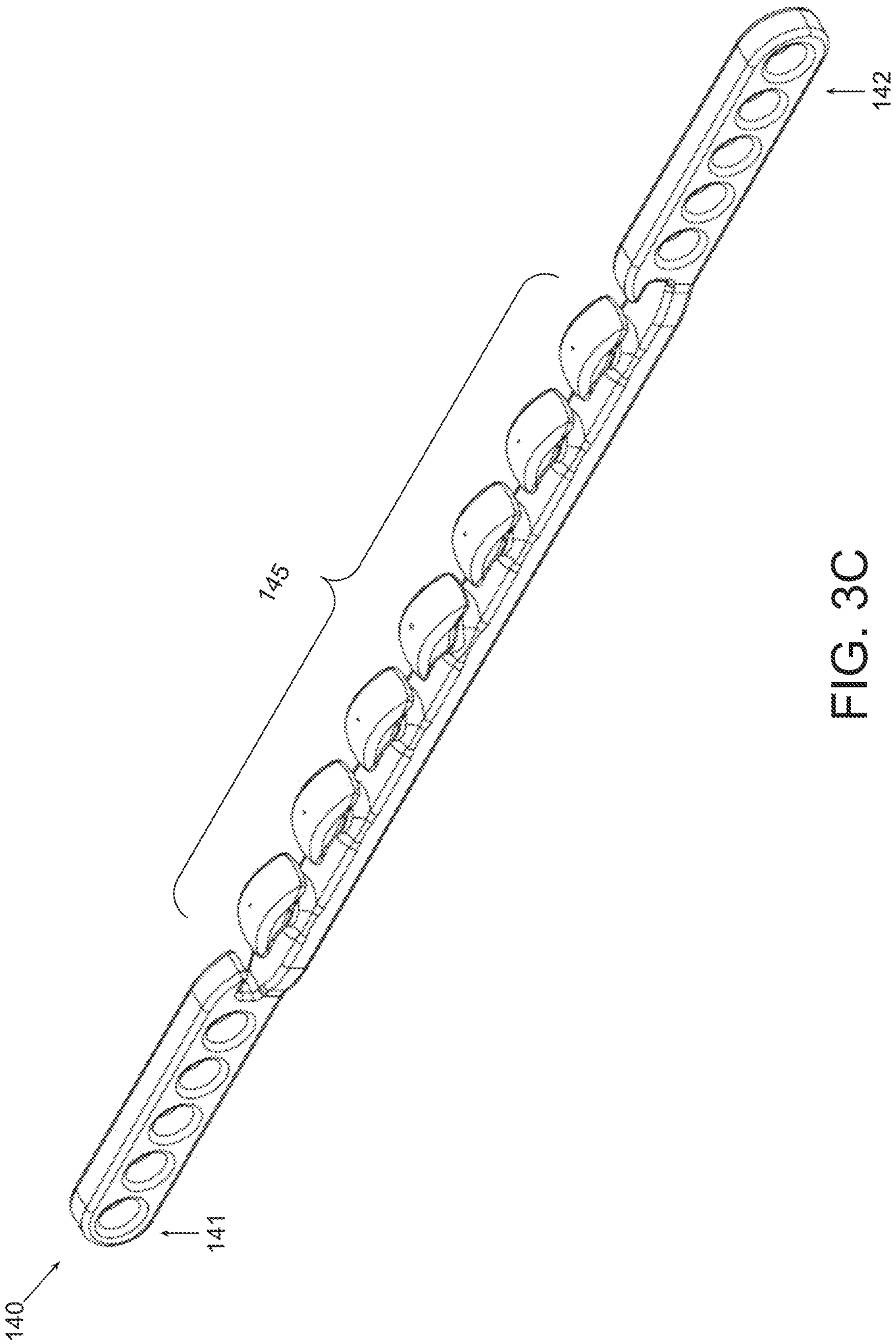
Figure 3D:
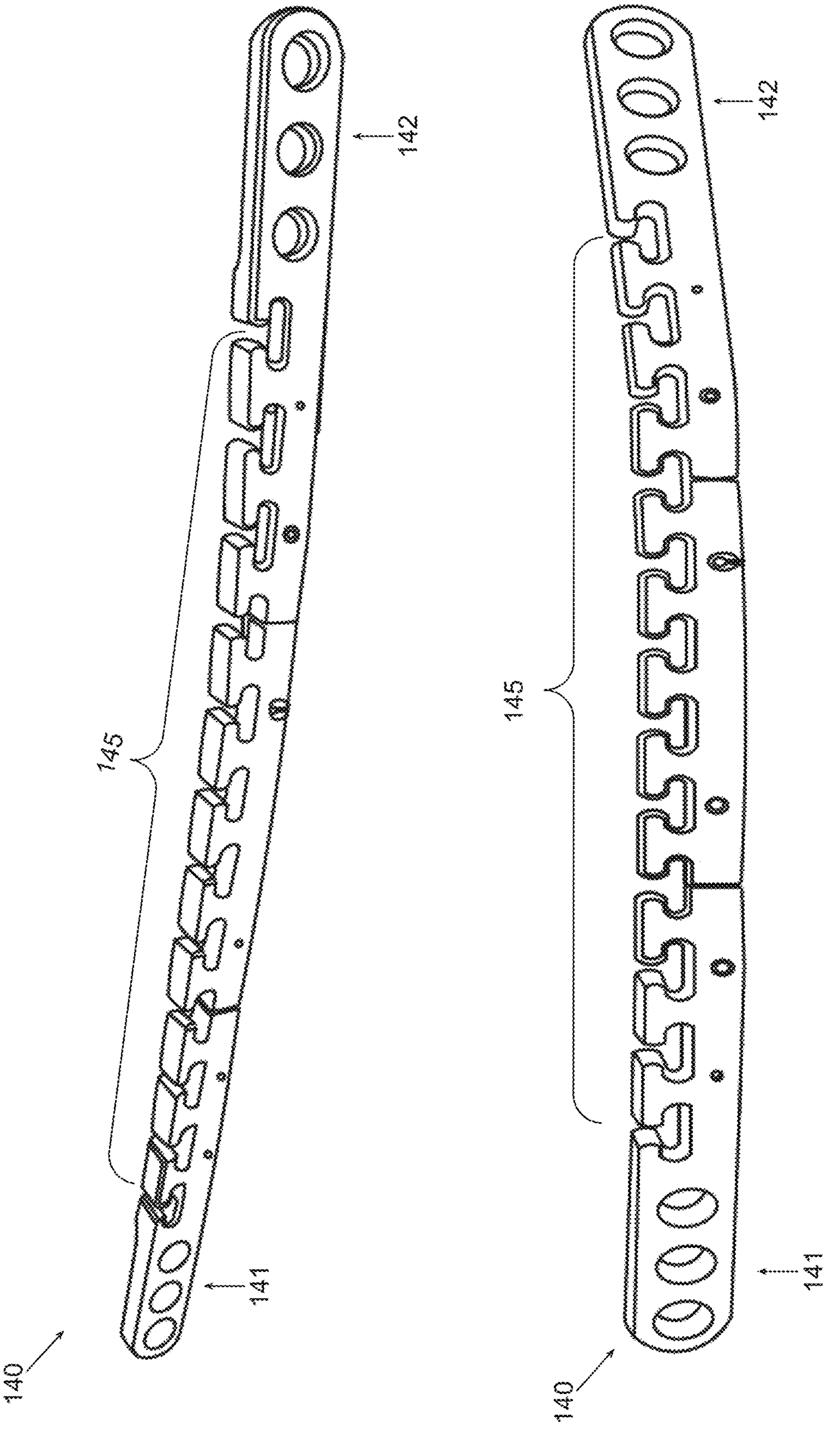

Referring to FIGS. 2A and 2B, each of the one or more adaptor brackets (110) comprises a first side (111), a second side (112), a third side (113), and a fourth side (114). In some embodiments, each of the one or more adaptor brackets (110) comprises a first side (111), a second side (112) opposite to the first side (111), a third side (113), and a fourth side (114) opposite to the third side (113). In further embodiments, each of the one or more adaptor brackets (110) comprises a fifth side (115) and a sixth side (116) opposite to the fifth side (115). In some embodiments, the second side (112) comprises a concave surface (117). In some embodiments, the concave surface (117) is rounded (see FIGS. 2A and 2B). In other embodiments, the concave surface (117) is squared. The concave surface (117) allows for the attachment of the adaptor bracket (110) to the stability aid. In some embodiments, the one or more adaptor brackets (110) are attached to the stability aid via a bracket attachment component (118).

The present invention features a limb assistance device (100) for assisting in the movement of a lower limb (e.g., a leg and/or a foot). The limb assistance device (100) may comprise two adaptor brackets (110) attached to a stability aid, an elastic cord (130) coupled to at least one of the two adaptor brackets (110), and an intermediate component (140) attached to the elastic cord (130). The intermediate component (140) allows for the adjustment of the elastic cord (130) to compensate for a gait pattern of a user. In some embodiments, the elastic cord (130) comprises an attachment component (160) for attaching the limb assistance device (100) to the user (e.g., to a user's foot or shoe).

The limb assistance device (100) described herein may comprise two adaptor brackets (110). Each of the two adaptor brackets (110) comprises a first side (111), a second side (112) opposite to the first side (111), a third side (113), and a fourth side (114) opposite to the third side (113). In further embodiments, each of the two adaptor brackets (110) comprises a fifth side (115) and a sixth side (116) opposite to the fifth side (115). In some embodiments, the second side (112) comprises a concave surface (117). In some embodiments, the concave surface (117) is rounded. In other embodiments, the concave surface (117) is squared.

The concave surface (117) allows for the attachment of the adaptor bracket (110) to the stability aid, e.g., a walker. For example, the concave surface (117) allows for the attachment of the adaptor bracket (110) to a front bar or a sidebar of a walker (e.g., an upper portion of the walker).

In some embodiments, the adaptor brackets (110) are attached to the stability aid via a bracket attachment component (118). In some embodiments, the bracket attachment component (118) is disposed at or near the first side (111) and on either the third side (113), the fourth side (114), or both sides of the adaptor bracket (110). In some embodiments, the bracket attachment component (118) is disposed at or near the second side (112) and on either the third side (113), the fourth side (114), or both sides of the adaptor bracket (110). In some embodiments, the bracket attachment component (118) is configured to attach and secure the limb assistance device (100) to a stability aid. For example, the bracket attachment component (118) may attach and secure the adaptor brackets (110) to the frame of a walker. In some embodiments, the attachment component (118) attaches and secures the adaptor brackets (110) to the crossbar of the walker and/or walker frame. In other embodiments, the attachment component (118) attaches and secures the adaptor brackets (110) to the handle area or other features of the walker and/or walker frame.

In some embodiments, the bracket attachment component (118) may comprise a hook-and-loop fastener or the like. In some embodiments, the attachment component (118) may comprise a silicon and/or plastic strap, optionally, comprising a buckle component. In certain embodiments, the bracket attachment component (118) may be integrated with the adaptor bracket (110). In other embodiments, the bracket attachment component (118) may be integrated with the intermediate component (140).

The limb assistance device (100) described herein may comprise at least one connector component (120) attached to at least one of the adaptor brackets (110). In some embodiments, each of the one or more adaptor brackets (110; e.g., the two adaptor brackets) comprises at least one connector component (120) attached thereto. In some embodiments, each of the one or more adaptor brackets (110; e.g., the two adaptor brackets) comprises at least two connector components (120) attached thereto. In some embodiments, the connector component (120) attaches at or near the second side (112) of each of the adaptor brackets (110). In some embodiments, the connector component (120) attaches at or near the second side (112) and on either the third side (113), the fourth side (114), or both the third and fourth sides (113, 114) of each of the adaptor brackets (110). In alternative embodiments, the connector component (120) attaches at or near the second side (112) and on either the fifth side (115), the sixth side (116), or both the fifth and sixth sides (115, 116) of each of the adaptor brackets (110).

Referring to FIG. 3A-3D, the intermediate component (140) comprises a first end (141), a second end (141), and a plurality of notches (145). The elastic cord (130) may be operatively connected to the plurality of notches (145) on the intermediate component (140). In some embodiments, the elastic cord (130) is disposed through at least two notches of the plurality of notches (145) of the intermediate component (140).

In some embodiments, the intermediate component (145) is attached to an adaptor bracket (110) or at least one adaptor bracket (110). In some embodiments, the intermediate component (140) is attached to each of the one or more adaptor brackets (110), e.g., a first end (141) of the intermediate component (140) is attached to one of the adaptor brackets (110; e.g., a first adaptor bracket (110*a*)), and a second end (142) of the intermediate component (140) is attached to the other adaptor brackets (110, e.g., a second adaptor bracket (110*b*)). In some embodiments, the intermediate component (140) is attached to each of the two adaptor brackets (110), e.g., a first end (141) of the intermediate component (140) is attached to one of the adaptor brackets (110; e.g., a first adaptor bracket (110*a*)), and a second end (142) of the intermediate component (140) is attached to the other adaptor brackets (110, e.g., a second adaptor bracket (110*b*)).

In some embodiments, the intermediate component (140) is attached to a connector component (120) or at least one connector component (120). In some embodiments, the intermediate component (140) is attached to each of the connector components (120), e.g., a first end (141) of the intermediate component (140) is attached to one of the connector components (120, e.g., a first connector component), and a second end (142) of the intermediate component (140) is attached to the other connector component (120, e.g., a second connector component). For instance, the first end (141) of the intermediate component (140) may be attached to a first side of a connector component (120), and a second side of the connector component (120) may be attached to an adapter bracket (110; e.g., a first adaptor bracket), and/or a second end (142) of the intermediate component (140) may be attached to a first side of a connector component (120) and a second side of the connector component (120) may be attached to an adapter bracket (110; e.g., a second adapter bracket).

In some embodiments, the length of the intermediate component (140) can vary from a few inches up to about two feet, depending on whether the intermediate component (140) is being used for one or both legs and/or feet and whether it is being used for a small child with a pediatric walker or a larger (e.g., an obese) adult with a bariatric walker. In some embodiments, the length of the intermediate component (140) is about 6 inches, or about 9 inches, or about 12 inches, or about 15 inches, or about 18 inches, or about 21 inches, or about 24 inches. In some embodiments, the intermediate component (140) extends between the front legs of a stability device (100; e.g., a walker; see FIG. 1C or 1D)

In some embodiments, the intermediate component (140) has about 4 to 15 notches. In some embodiments, the intermediate component (140) has about 4 to 14 notches, or about 4 to 13 notches, or about 4 to 12 notches, or about 4 to 11 notches, or about 4 to 10 notches, or about 4 to 9 notches, or about 4 to 8 notches, or about 4 to 7 notches, or about 4 to 6 notches. In some embodiments, the intermediate component (140) has about 5 to 15 notches, or about 5 to 14 notches, or about 5 to 13 notches, or about 5 to 12 notches, or about 5 to 11 notches, or about 5 to 10 notches, or about 5 to 9 notches, or about 5 to 8 notches, or about 5 to 7 notches, or about 5 to 6 notches. In some embodiments, the intermediate component (140) has about 6 to 15 notches, or about 6 to 14 notches, or about 6 to 13 notches, or about 6 to 12 notches, or about 6 to 11 notches, or about 6 to 10 notches, or about 6 to 9 notches, or about 6 to 8 notches, or about 6 to 7 notches. In some embodiments, the intermediate component (140) has about 7 to 15 notches, or about 7 to 14 notches, or about 7 to 13 notches, or about 7 to 12 notches, or about 7 to 11 notches, or about 7 to 10 notches, or about 7 to 9 notches, or about 7 to 8 notches, or about 8 to 15 notches, or about 8 to 14 notches, or about 8 to 13 notches, or about 8 to 12 notches, or about 8 to 11 notches, or about 8 to 10 notches, or about 8 to 9 notches. In some embodiments, the intermediate component (140) has about 9 to 15 notches, or about 9 to 14 notches, or about 9 to 13 notches, or about 9 to 12 notches, or about 9 to 11 notches, or about 9 to 10 notches, or about 10 to 15 notches, or about 10 to 14 notches, or about 10 to 13 notches, or about 10 to 12 notches, or about 10 to 11 notches. In some embodiments, the intermediate component (140) has about 11 to 15 notches, or about 11 to 14 notches, or about 11 to 13 notches, or about 11 to 12 notches, or about 12 to 15 notches, or about 12 to 14 notches, or about 12 to 13 notches, or about 13 to 15 notches, or about 13 to 14 notches, or about 14 to 15 notches. In certain embodiments, the intermediate component (140) comprises about 4 notches, or about 5 notches, or about 6 notches, or about 7 notches, or about 8 notches, or about 9 notches, or about 10 notches, or about 11 notches, or about 12 notches, or about 13 notches, or about 14 notches, or about 15 notches. In some embodiments, the intermediate component (140) comprises more than 15 notches. The present invention is not limited to the aforementioned number of notches.

In some embodiments, the intermediate component (140) is attached to the stability aid via a bracket attachment component (118). In some embodiments, the bracket attachment component (118) is disposed at or near the first end (141), the second end (142), or both the first end and the second end (141,142) of the intermediate component (140). In some embodiments, the bracket attachment component (118) is configured to attach and secure the limb assistance device (100) to a stability aid. For example, the bracket attachment component (118) may attach and secure the intermediate component (140) to the frame of a walker. In certain embodiments, the intermediate component (140) is directly attached to the frame of the walker. In other embodiments, the intermediate component (140) is integrated with the frame of the walker.

In certain embodiments, the intermediate component (140) is configured to house and/or accommodate the elastic cords (130). For example, the elastic cords (130) may be integrated into the intermediate component (140).

In some embodiments, the elastic cord (130) comprises a first end (131) and a second end (132). In some embodiments, the elastic cord (130) is coupled to at least one of the one or more adaptor brackets (110). In some embodiments, the elastic cord (130) is coupled to each of the one or more adaptor brackets (110; e.g., two adaptor brackets). In certain embodiments, the elastic cord (130) is directly attached to the adapter brackets (110), e.g., the first end (131) of the elastic cord (130) may directly attach to an adaptor bracket (110; e.g., a first adaptor bracket (110*a*)) and/or the second end (132) of the elastic cord (130) may directly attach to an adapter bracket (110; e.g., a second adaptor bracket (110*b*)). In other embodiments, the first end (131) of the elastic cord (130) attaches to one of the adaptor brackets (111; e.g., a first adaptor bracket (110*a*)), and a second end (132) of the elastic cord (130) attaches to another adaptor bracket (111; e.g., a second adaptor bracket (110*b*)).

In some embodiments, the elastic cord (130) is coupled to at least one of the one or more adaptor brackets (110) via the intermediate component (140), e.g., a first end (131) of the elastic cord (130) attaches to the first end (141) of the intermediate component (140) and a second end (132) of the elastic cord (130) attaches to the second end (142) of the intermediate component (142).

In some embodiments, the elastic cord (130) is coupled to at least one connector component (120). In some embodiments, the elastic cord (130) is coupled to at least two connector components (120), e.g., a first end (131) of the elastic cord (130) attaches to a first connector component (120) on a first adaptor bracket (110*a*) and a second end (132) of the elastic cord (130) attaches to a second connector component (120) on a second adaptor bracket (110*b*). In some embodiments, the elastic cord (130) is coupled to each of the connector components (120). In certain embodiments, the first end (131) of the elastic cord (130) may be attached to a first side of one connector component (120), and the second side of the connector component (120) may be attached to an adapter bracket (110; e.g., a first adaptor bracket (110*a*)) and/or the second end (132) of the elastic cord (130) may be attached to a first side of another connector component (120), and the second side of the connector component (120) may be attached to an adapter bracket (110; e.g., a second adaptor bracket (110*b*)).

In some embodiments, the first end (131) of the elastic cord (130) attaches to the first end (141) of the intermediate component (140), and a second end (132) of the elastic cord (130) attaches to the second end (142) of the intermediate component (140). In other embodiments, the first end (131) of the elastic cord (130) directly attaches to the first end (141) of the intermediate component (140), and a second end (132) of the elastic cord (130) directly attaches to the second end (142) of the intermediate component (140). In further embodiments, the first end (131) of the elastic cord (130) may be attached to a first side of one connector component (120), and the second side of the connector component (120) may be attached to the first end (141) of the intermediate component (140) and/or the second end (132) of the elastic cord (130) may be attached to a first side of another connector component (120), and the second side of the connector component (120) may be attached to the second end (142) of the intermediate component (140).

In further embodiments, the first end (131) of the elastic cord (130) attaches to one of the connector components (120; e.g., a first connector component); and a second end (132) of the elastic cord (130) attaches to the other connector component (120; e.g., a second connector component).

In alternative embodiments, the first end (131) of the elastic cord (130) attaches to the first end (141) of the intermediate component (140), and a second end (132) of the elastic cord (130) attaches to a second adaptor bracket (110*b*), or vice versa, e.g., the first end (131) of the elastic cord (130) attaches a first adaptor bracket (110*a*) and a second end (132) of the elastic cord (130) attaches to the second end (142) of the intermediate component (140). In other embodiments, the first end (131) of the elastic cord (130) attaches to the first end (141) of the intermediate component (140), and a second end (132) of the elastic cord (130) attaches to a connector component (120), e.g., on a second adaptor bracket (110*b*), or vice versa, e.g., the first end (131) of the elastic cord (130) attaches a connector component (120), e.g., on a first adaptor bracket (110*a*), and a second end (132) of the elastic cord (130) attaches to the second end (142) of the intermediate component (140).

In some embodiments, the connector components (120) may comprise straps, hooks (e.g., S-hooks), magnets, other fasteners, or the like.

The limb assistance devices (100) described herein may further comprise at least one reciprocating component (150) comprising a first end (151) and a second end (152), In some embodiments, the limb assistance devices (100) comprise two reciprocating components (150), each comprising a first end (151) and a second end (152). The reciprocating component (150) may be slidably connected to the elastic cord (130; e.g., via the first end (151)). In some embodiments, the reciprocating component (150) is curved. In some embodiments, the reciprocating component (150) is straight.

Figure 4A:
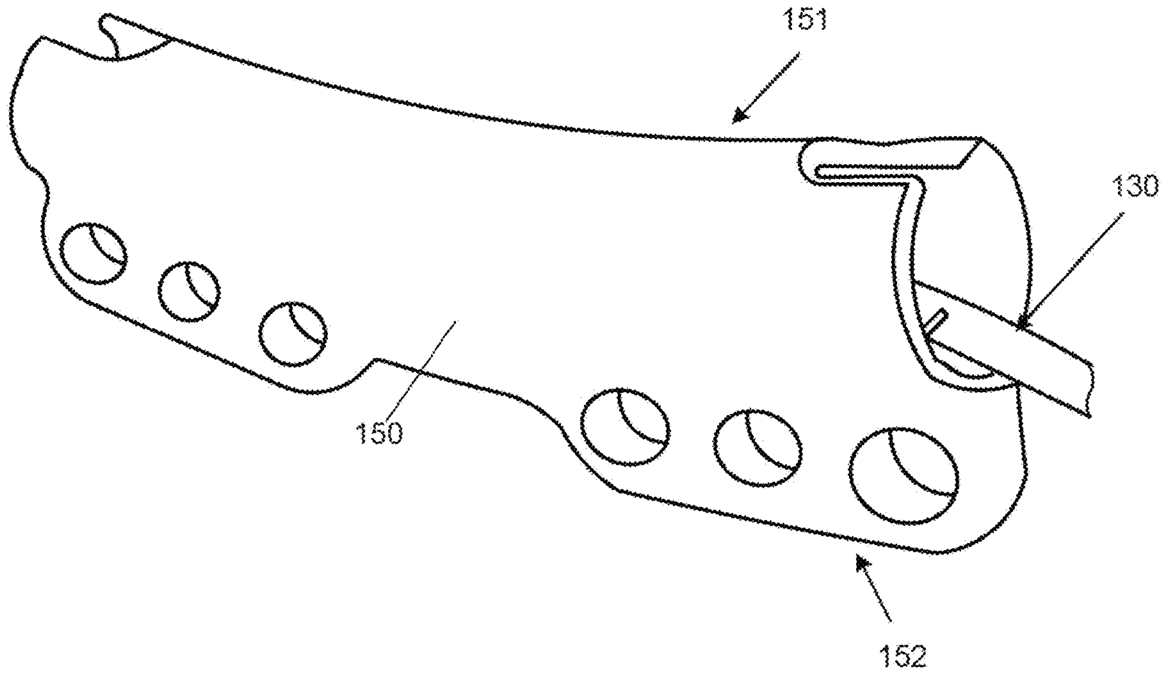
FIG. 4A-4D show several embodiments of the reciprocating components of the present invention.

Referring to FIG. 4A, the reciprocating component (150) comprises a channel disposed at or near the first end (151) of the reciprocating component (150), where the channel is configured to accommodate the elastic cord (130) therethrough.

Figure 4B:
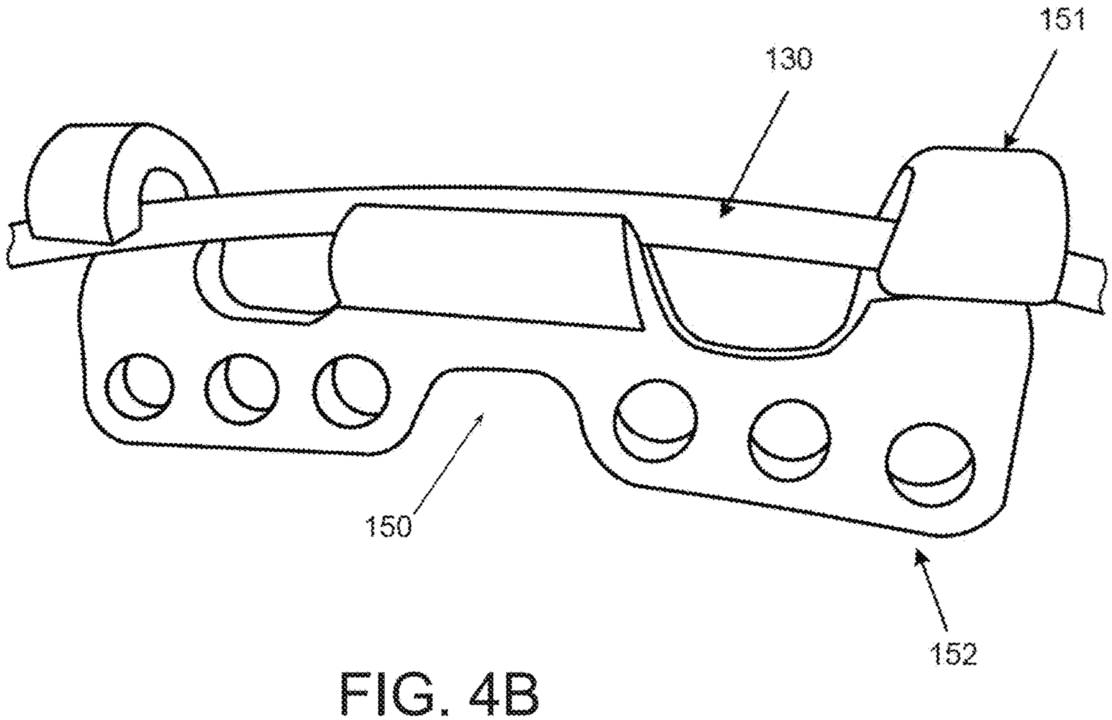
Figure 4C:
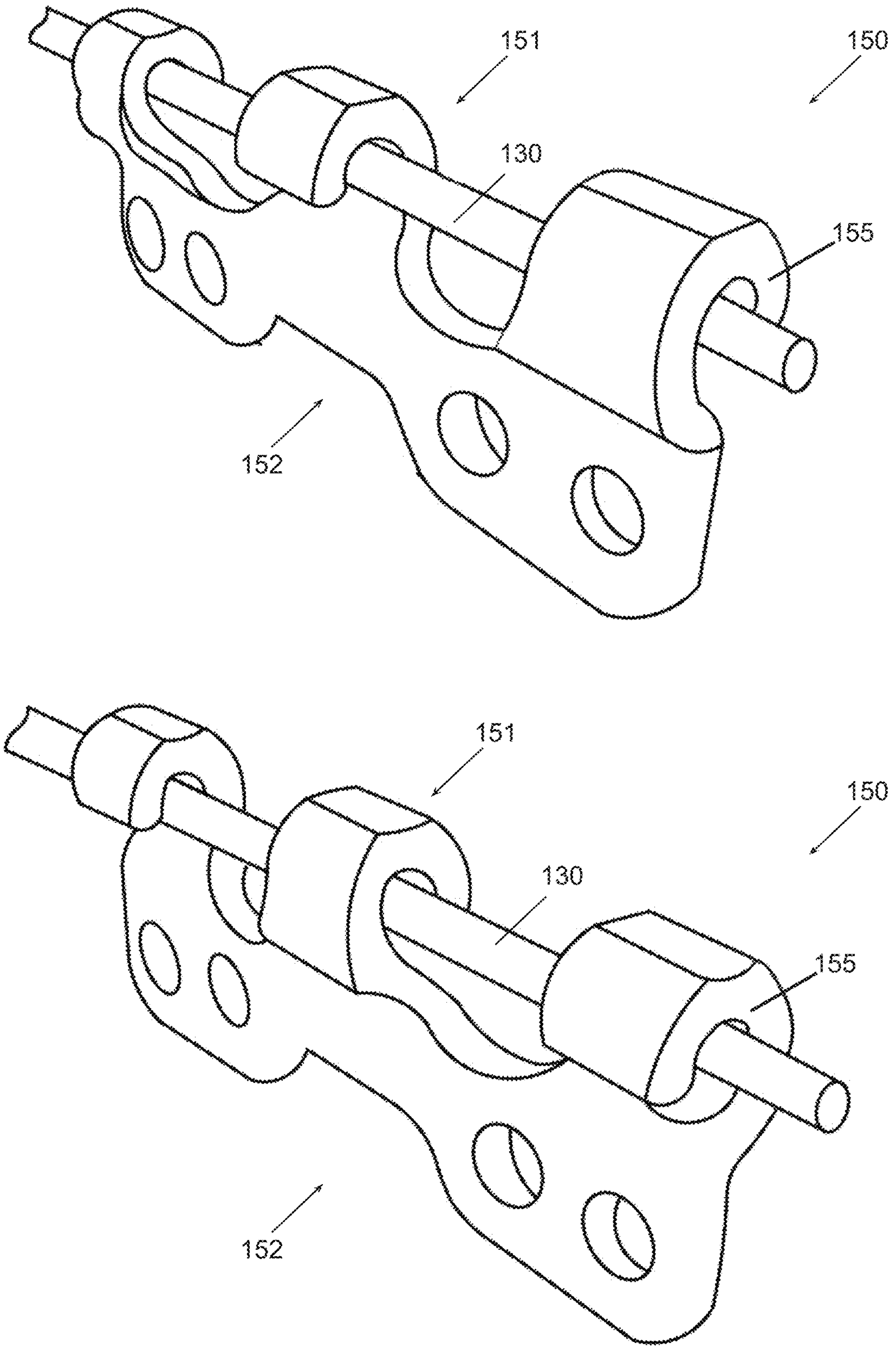
Figure 4D:
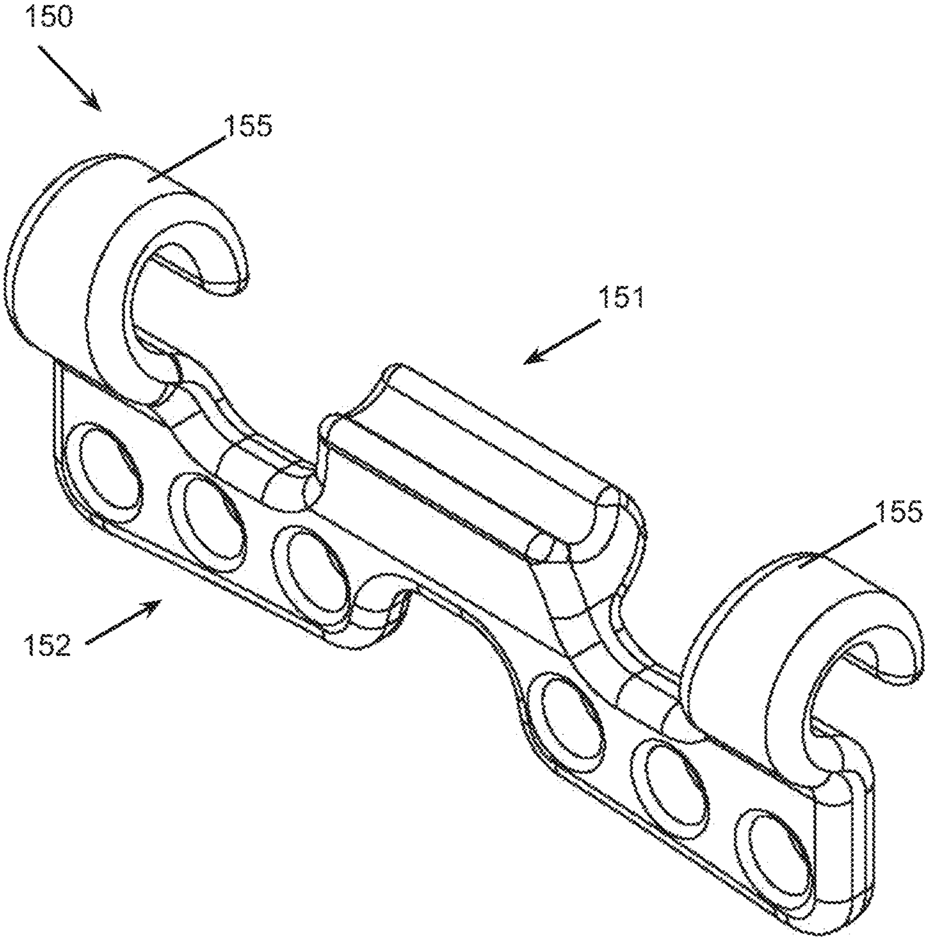

In some embodiments, the reciprocating component (150) comprises at least one hook component (155) at or near the first end (151) of the reciprocating component (150), where the hook component is configured to accommodate the elastic cord (130). Referring to FIGS. 4B and 4D, the reciprocating component (150) comprises two hook components at or near the first end (151) of the reciprocating component (150), wherein the hook component (155) is configured to accommodate the elastic cord (130). Referring to FIG. 4C, the reciprocating component (150) comprises three hook components (155) at or near the first end (151) of the reciprocating component (150), wherein the hook components (155) are configured to accommodate the elastic cord (130).

Without wishing to limit the present invention to any theories or mechanisms, it is believed that the hook component (155) allows for the elastic cord (130) to be easily disconnected from the reciprocating component (150). Furthermore, this may allow a user to "undo" or "make themselves free of" the limb assistance device (100) described herein in order to move and communicate freely; therefore, the limb assistance device (100) does not restrain the user.

In some embodiments, the elastic cord (130) may be manually removed (e.g., unattached) from the reciprocating component (150). As such, the reciprocating component (150) may be configured such that a user has to manually attach and remove the elastic cord (130) from the reciprocating component (150). In other embodiments, the elastic cord (130) may be automatically removed (e.g., unattached) from the reciprocating component (150). For example, the reciprocating component (150) may be configured such that a user may remove the elastic cord (130) from the reciprocating component (150) without having to bend down (i.e., without having to reach towards their own leg and/or foot). In certain embodiments, the elastic cord (130) may be automatically removed (e.g., unattached) from the reciprocating component (150) via a pull cord, a lever and/or wand, a magnetic, or the like, or a combination thereof.

In some embodiments, the reciprocating component (150) comprises at least one attachment component (160) disposed on the second end (152) of the reciprocating component (150). In some embodiments, the reciprocating component (150) comprises two attachment components (160) disposed on the second end (152) of the reciprocating component (150). In some embodiments, the attachment component (160) is configured to attach to a shoe or other piece of footwear. For example, the second end (152) of the reciprocating component (150) may attach to a first end of an attachment component (160), and a second end of the attachment component (160) may attach to a shoe or other piece of footwear. In other embodiments, the attachment mechanism may be built into the shoe, boot, brace, or prosthesis.

The attachment component (160) may be selected from a group comprising a fastener, a clip, a snap, a hook, a ring, a wrap, a cuff, a tray, a velcro strap, an adhesive, or a combination thereof. In some embodiments, the attachment component (160) may be configured to attach to a shoe (e.g., a first shoe or a second shoe) of a user. In other embodiments, the attachment component (160) may be configured to attach to a brace, a boot, a prosthesis, a wrap, or a garment for the foot.

In some embodiments, the attachment component (160) may attach to a proximal end of a first shoe (e.g., either attaching medially or laterally) or a distal end of a first shoe (e.g., either attaching medially or laterally). In some embodiments, the attachment component (160) may attach to a side (e.g., near the medial or lateral malleolus; e.g., proximally) of a first shoe, a toe portion (e.g., near the toe box; e.g., distally) of a first shoe or a combination thereof. In some embodiments, the attachment component (160) may attach to the eyelets of a shoe (e.g., a first shoe or a second shoe) near the proximal end of the shoe (e.g., either attaching medially or laterally).

In some embodiments, the stability aid comprises a walker. In other embodiments, the stability aid comprises parallel bars. As used herein, "parallel bars" refers to medical devices specifically used in physical and occupational rehabilitation therapy to assist individuals to re-learn to walk and for gait training, as well as to regain balance, strength, range of motion, and mobility.

In some embodiments, the limb assistance device (100) may comprise an intermediate component (140) integrated into a stability aid (e.g., a walker) and an elastic cord (130) coupled to the intermediate component (140). In other embodiments, the limb assistance device (100) may comprise an adaptor bracket (110) integrated into a stability aid (e.g., a walker), an elastic cord (130) coupled to the adaptor bracket (110), and an intermediate component (140) attached to the elastic cord (130).

The present invention may feature a limb assistance device (100) for assisting in the movement of lower limbs. The device (100) may comprise a first adaptor bracket (110*a*) and a second adaptor bracket (110*b*), each configured to be attached to a stability aid, an intermediate component (140) comprising a first end (141), a second end (142) and a plurality of notches (145), wherein the first end (141) of the intermediate component (140) attaches to the first adaptor bracket (110*a*) and the second end (142) of the intermediate component (140) attaches to the second adaptor bracket (110*b*); and an elastic cord (130) coupled to the intermediate component (140). The elastic cord (130) may comprise at least one attachment component (160) for attaching the limb assistance device (100) to the user. In some embodiments, the intermediate component (140) allows for the adjustment of the elastic cord (130) to compensate for a gait pattern of a user.

The present invention also features a limb assistance device (100) for assisting in the movement of a lower limb (e.g., a leg and/or a foot). The limb assistance device (100) may comprise two adaptor brackets (110), each bracket (110) comprising a first side (111), a second side (112) opposite to the first side (111), a third side (113), and a fourth side (114) opposite to the third side (113), wherein the second side (112) comprises a concave surface (117), at least two connector components (120) attached to each of the two adaptor brackets (110), an intermediate component (140) comprising a first end (141), a second end (141), and a plurality of notches (145), and attached to at least one of the two connector component (120), an elastic cord (130) operatively connected to the plurality of notches (145) on the intermediate component (140), at least one reciprocating component (150) slidably connected to the elastic cord (130) and at least one attachment component (160) disposed on the reciprocating component (150); wherein the attachment component (160) is configured to attach to a user (e.g., a user's shoe).

The present invention may also feature a limb assistance device (100) for assisting in the movement of a lower limb (e.g., a leg and/or a foot). The limb assistance device (100) may comprise two adaptor brackets (110), each bracket (110) comprising a first side (111), a second side (112) opposite to the first side (111), a third side (113), and a fourth side (114) opposite to the third side (113), wherein the second side (112) comprises a concave surface (117), at least two connector components (120) attached at or near the second side (112) of each of the adaptor brackets (110), an intermediate component (140) comprising a first end (141), a second end (141), and a plurality of notches (145), and attached to at least one connector component (120), an elastic cord (130) operatively connected to the plurality of notches (145) on the intermediate component (140), at least one reciprocating component (150) comprising a first end (151) and a second end (152), wherein the first end (151) of the reciprocating component (150) is connected to the elastic cord (130) and at least one attachment component (160) disposed on the second end (152) of the reciprocating component (150); wherein the attachment component (160) is configured to attach to a shoe.

In some embodiments, when the adaptor brackets (110) are moved out of line with the reciprocating component (150), tension is placed on the elastic cord (130), which allows the reciprocating component (150) to move back into a coplanar position with the adaptor brackets (110) which then allows for the tension on the elastic cord (130) to be released. In some embodiments, when the adaptor brackets (110) are moved out of line with the attachment component (160), tension is placed on the elastic cord (130), which allows the attachment component (160) to move back into a coplanar position with the adaptor brackets (110) which then allows for the tension on the elastic cord (130) to be released.

In some embodiments, when the adaptor brackets (110) are moved out of line with the reciprocating component (150), tension is placed on the elastic cord (130), which allows the reciprocating component (150) to realign (e.g., exactly or partially) with the adaptor brackets (110), which then allows for the tension on the elastic cord (130) to be released. In some embodiments, when the adaptor brackets (110) are moved out of line with the attachment component (160), tension is placed on the elastic cord (130), which allows the attachment component (160) to realign (e.g., exactly or partially) with the two adaptor brackets (110), which then allows for the tension on the elastic cord (130) to be released.

In some embodiments, when the adaptor brackets (110) are moved out of line with the reciprocating component (150), tension is placed on the elastic cord (130) to release the tension of the elastic cord (and to move a user's foot forward) the reciprocating component (150) must be realigned (e.g., exactly or partially) with the adaptor brackets (110). In some embodiments, when the adaptor brackets (110) are moved out of line with the attachment component (160), tension is placed on the elastic cord (130) to release the tension of the elastic cord (and to move a user's foot forward) the attachment component (160) must be realigned (e.g., exactly or partially) with the adaptor brackets (110).

The present invention may also feature a limb assistance device (100) for assisting in the movement of a lower limb (e.g., a leg and/or a foot). The limb assistance device (100) may comprise an intermediate component (140) attached to a stability aid (e.g., a walker) and an elastic cord (130) coupled to the intermediate component (140). The intermediate component (140) allows for the adjustment of the elastic cord (130) to compensate for a gait pattern of a user. In some embodiments, the elastic cord (130) comprises an attachment component (160) for attaching the limb assistance device (100) to the user (e.g., to a user's foot or shoe).

In other embodiments, the limb assistance device (100) comprises an intermediate component (140) comprising a first end (141), a second end (142), and a plurality of notches (145) and is configured to be attached to a stability aid, and an elastic cord (130) coupled to the intermediate component (140). The elastic cord (130) comprises an attachment component (160) for attaching the limb assistance device (100) to the user.

In some embodiments, when the reciprocating component (150) is moved out of line with the intermediate component (140), tension is placed on the elastic cord (130), which allows the reciprocating component (150) to move back into a coplanar position with the intermediate component (140) which then allows for the tension on the elastic cord (130) to be released. In some embodiments, when the attachment component (160) is moved out of line with the intermediate component (140), tension is placed on the elastic cord (130), which allows the attachment component (160) to move back into a coplanar position with the intermediate component (140) which then allows for the tension on the elastic cord (130) to be released.

In some embodiments, when the reciprocating component (150) is moved out of line with the intermediate component (140), tension is placed on the elastic cord (130), which allows the reciprocating component (150) to realign (e.g., exactly or partially) with the intermediate component (140), which then allows for the tension on the elastic cord (130) to be released. In some embodiments, when the attachment component (160) is moved out of line with the intermediate component (140), tension is placed on the elastic cord (130), which allows the attachment component (160) to realign (e.g., exactly or partially) with the intermediate component (140), which then allows for the tension on the elastic cord (130) to be released.

In some embodiments, when the reciprocating component (150) is moved out of line with the intermediate component (140), tension is placed on the elastic cord (130) to release the tension of the elastic cord (and to move a user's foot forward) the reciprocating component (150) must be realigned (e.g., exactly or partially) with the intermediate component (140). In some embodiments, when the attachment component (160) is moved out of line with the intermediate component (140), tension is placed on the elastic cord (130) to release the tension of the elastic cord (and to move a user's foot forward) the attachment component (160) must be realigned (e.g., exactly or partially) with the intermediate component (140).

Limb Assistance System

The present invention may further feature a limb assistance system comprising a limb assistance device (100) as described herein and a stability aid (e.g., a walker) to which the limb assistance device (100) is attached thereto. In some embodiments, the one or more adaptor brackets (110) are attached to the stability aid (e.g., the walker).

The present invention may also feature a limb assistance system comprising a limb assistance device (100) as described herein, a stability aid (e.g., a pair of parallel bars), and a coupling system for connecting the limb assistance device (100) to the stability aid (e.g., the parallel bars).

Figure 6A:
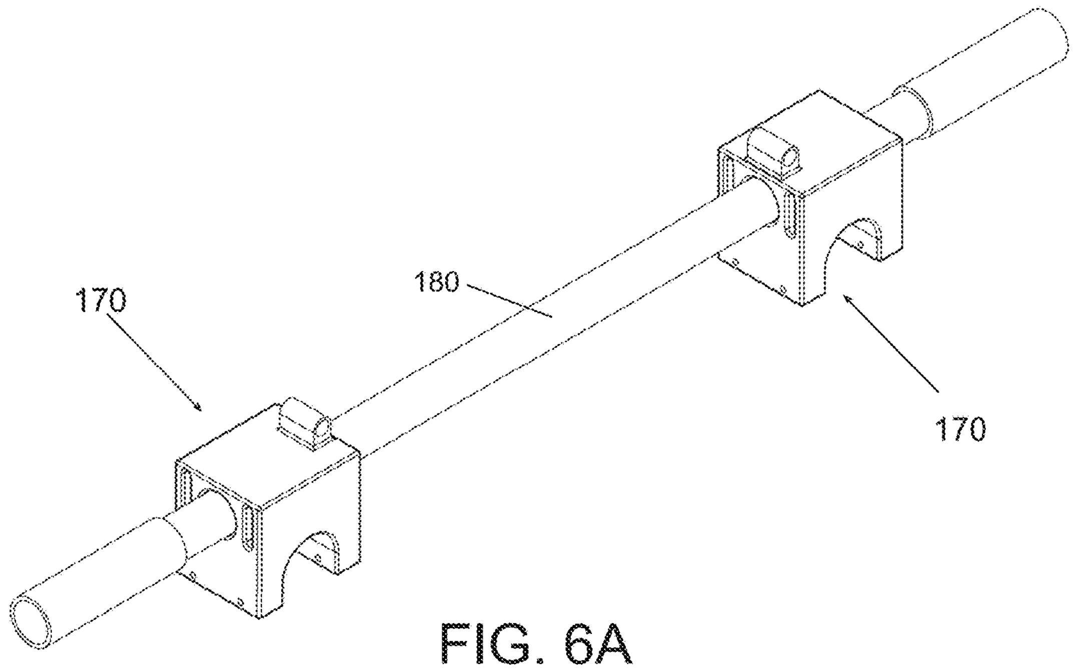
FIGS. 6A-6B show embodiments of the coupling system comprising glider brackets and a pole component.
Figure 6B:
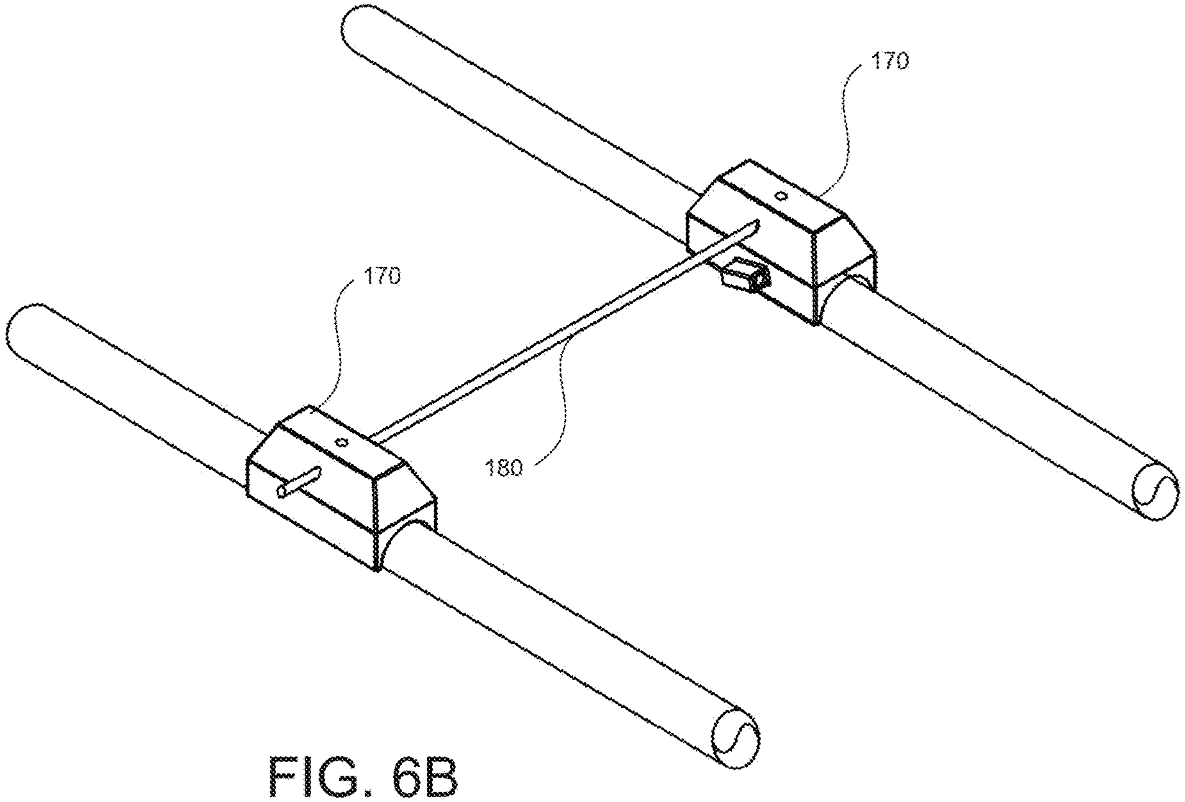
Figure 7A:
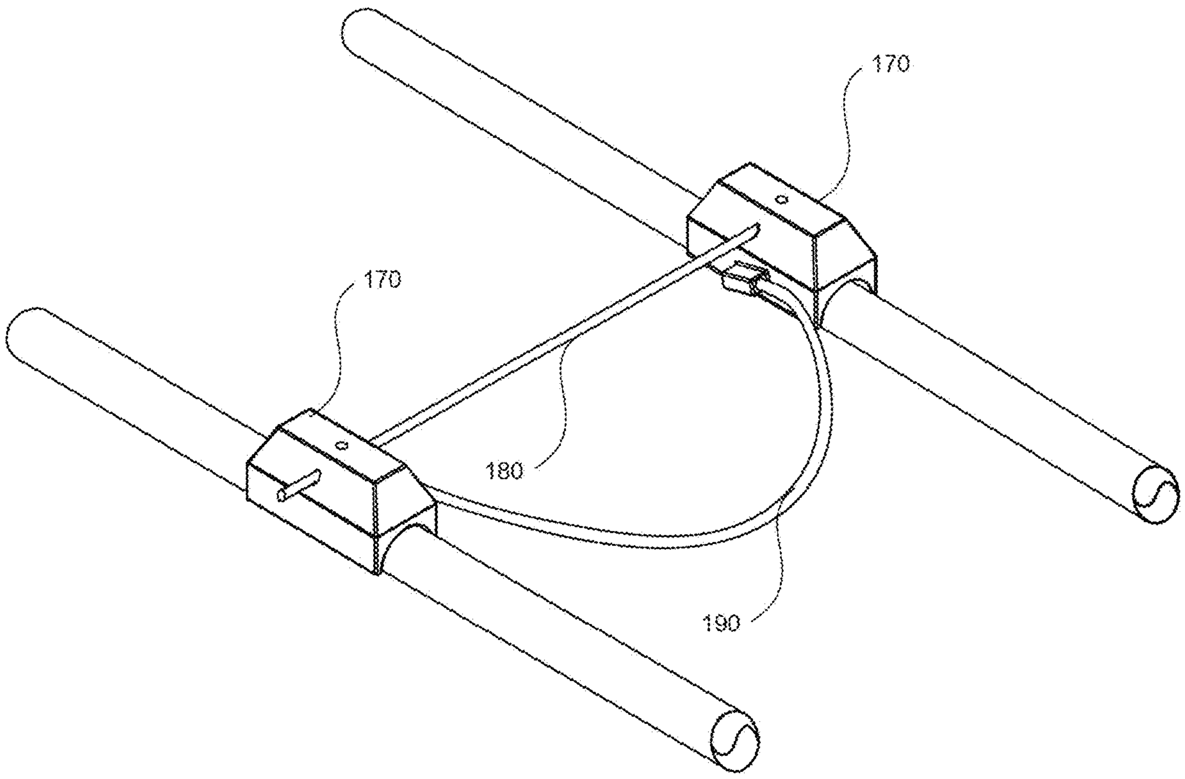
FIGS. 7A-7E show several embodiments of the coupling system comprising glider brackets, a pole component, and a spacer component described herein.
Figure 7B:
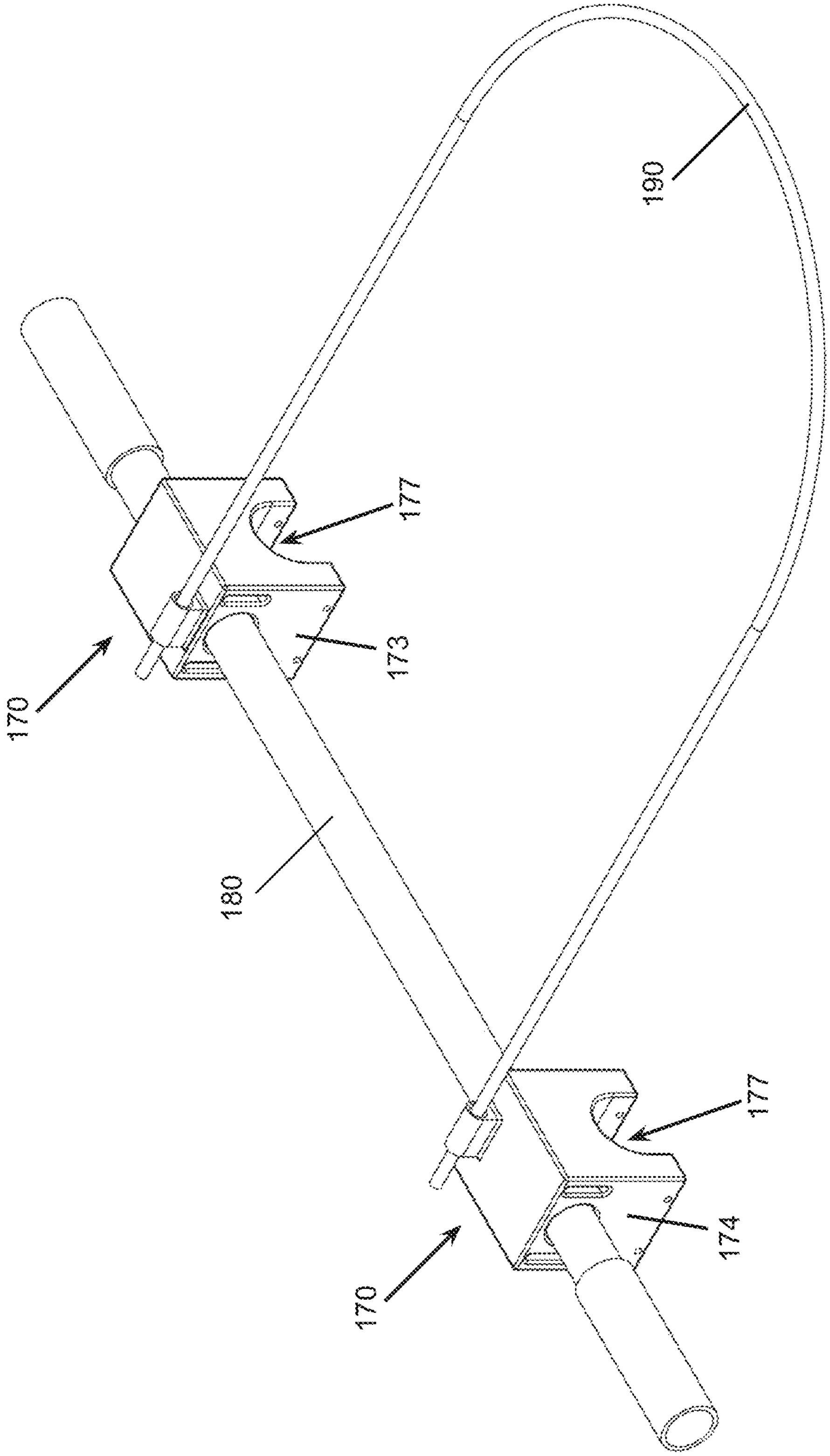
Figure 7C:
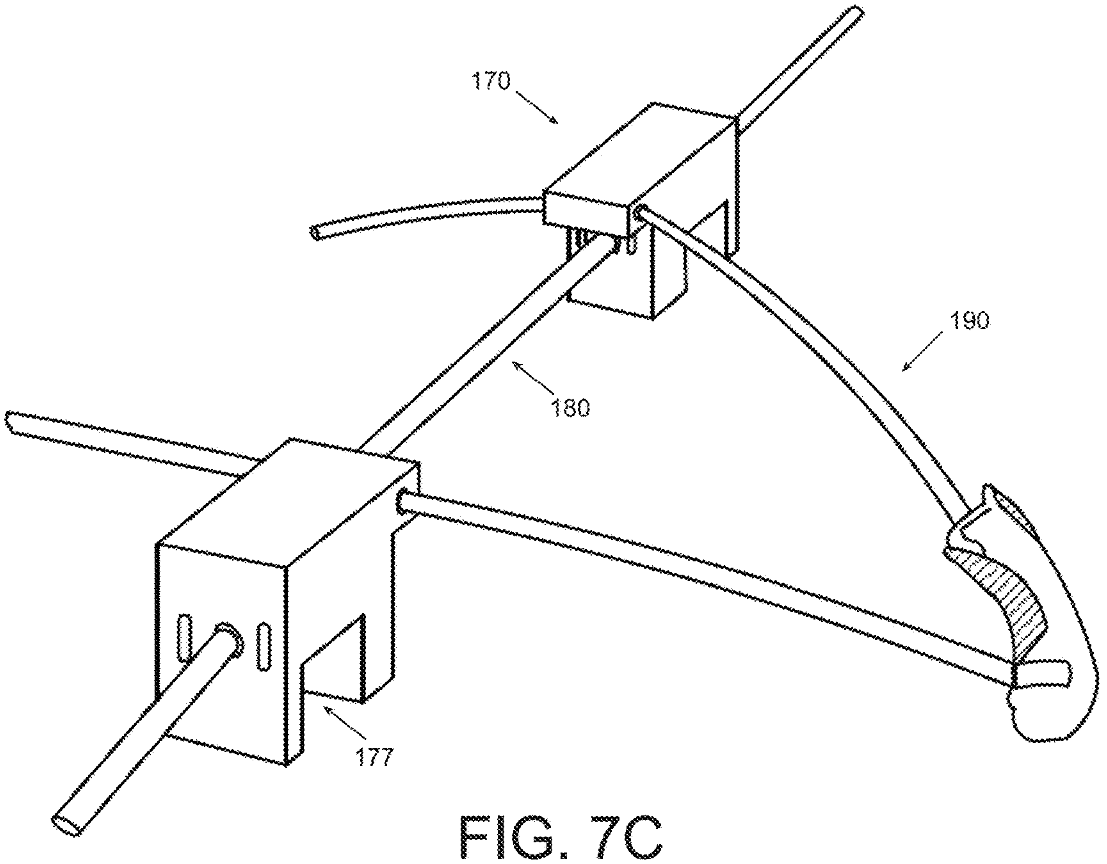
Figure 7D:
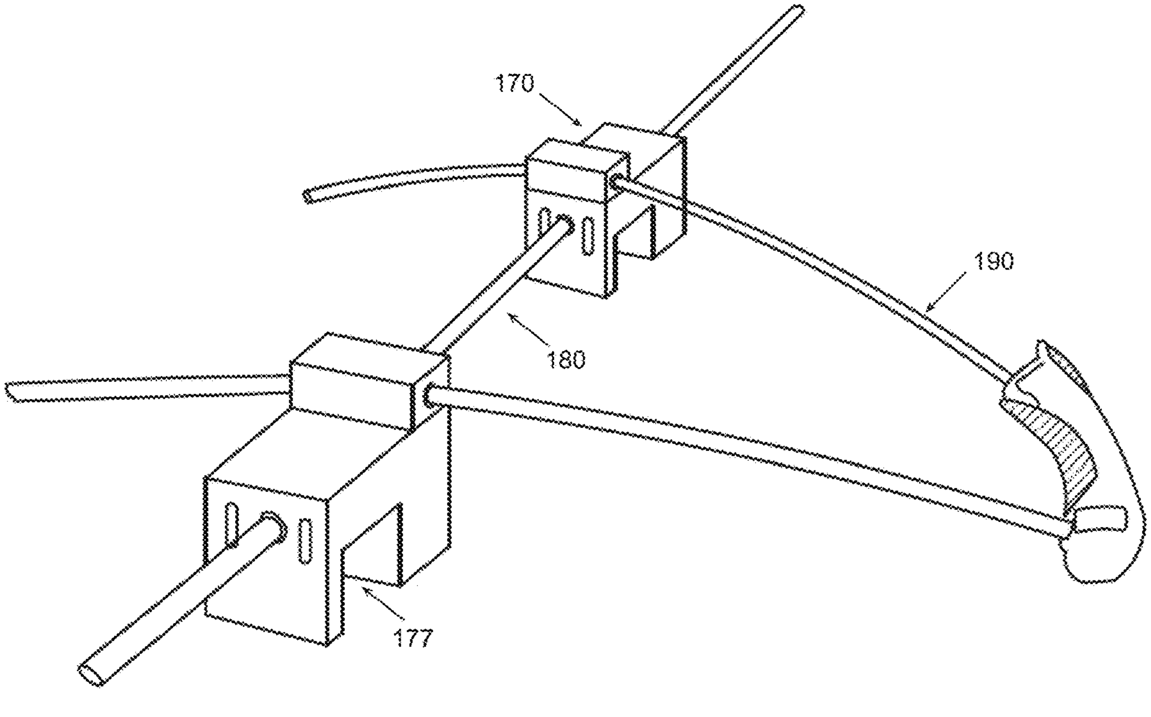
Figure 7E:
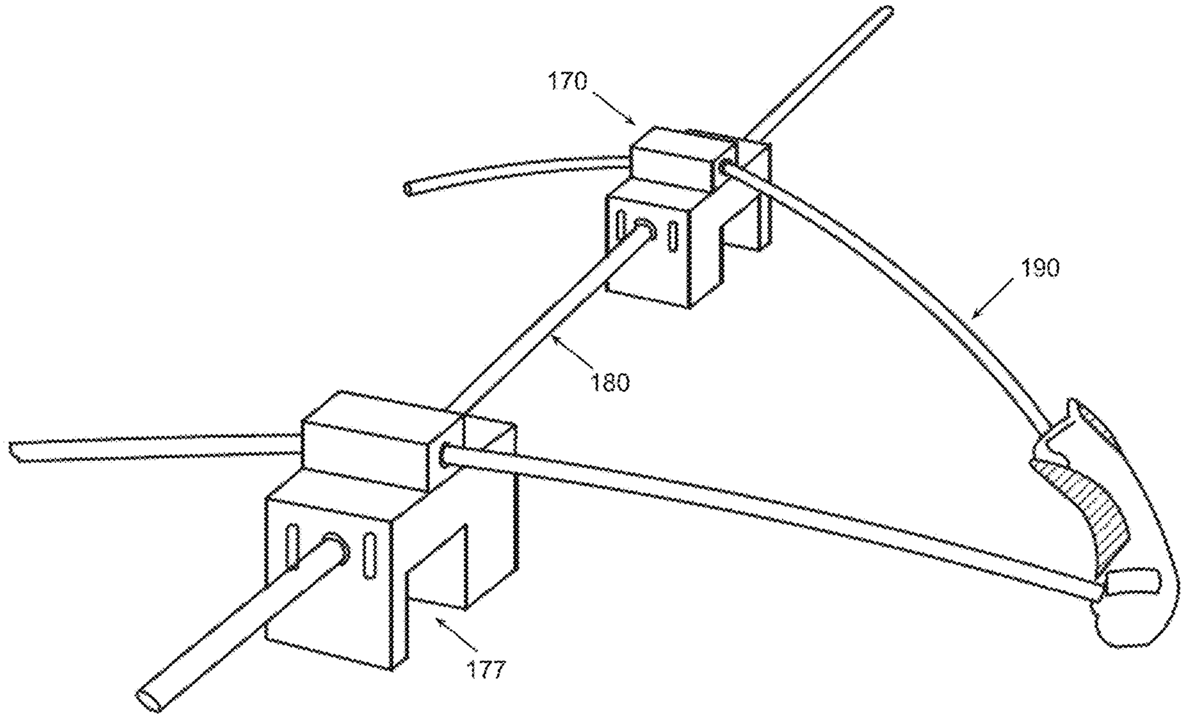
Figure 8A:
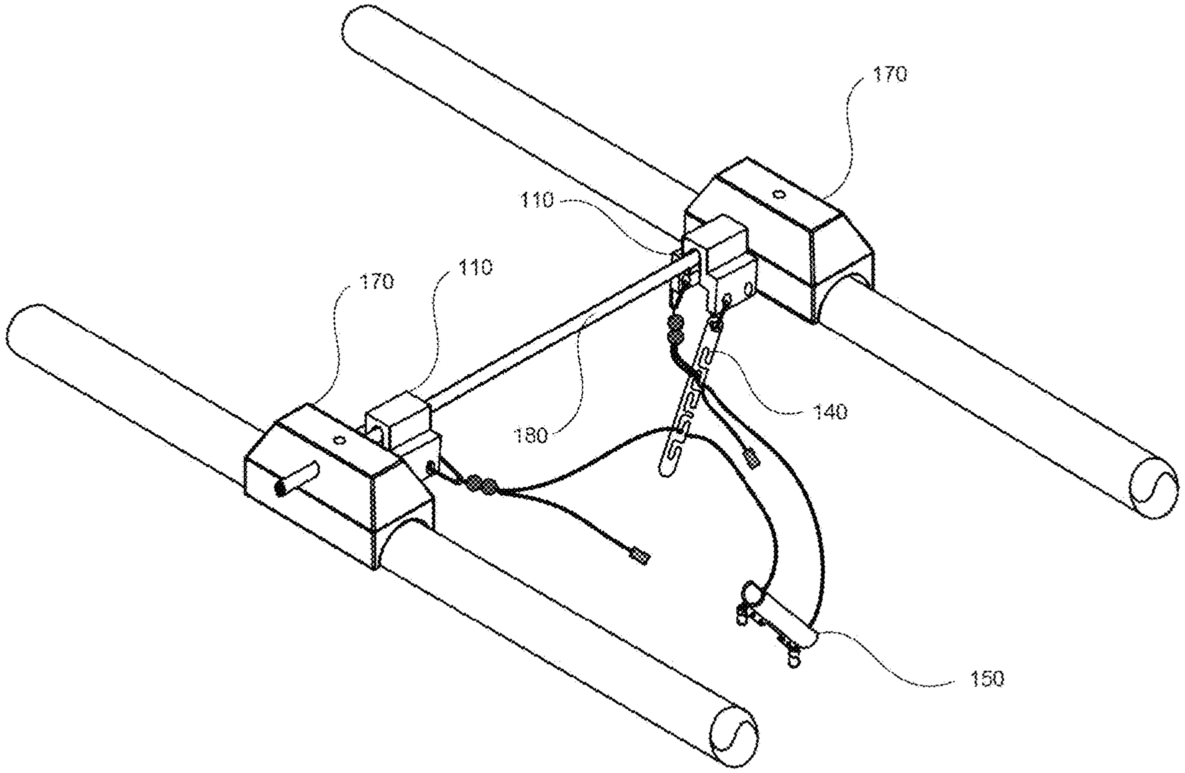
FIGS. 8A-8C show the limb assistance device along with the limb assistance system.
Figure 8B:
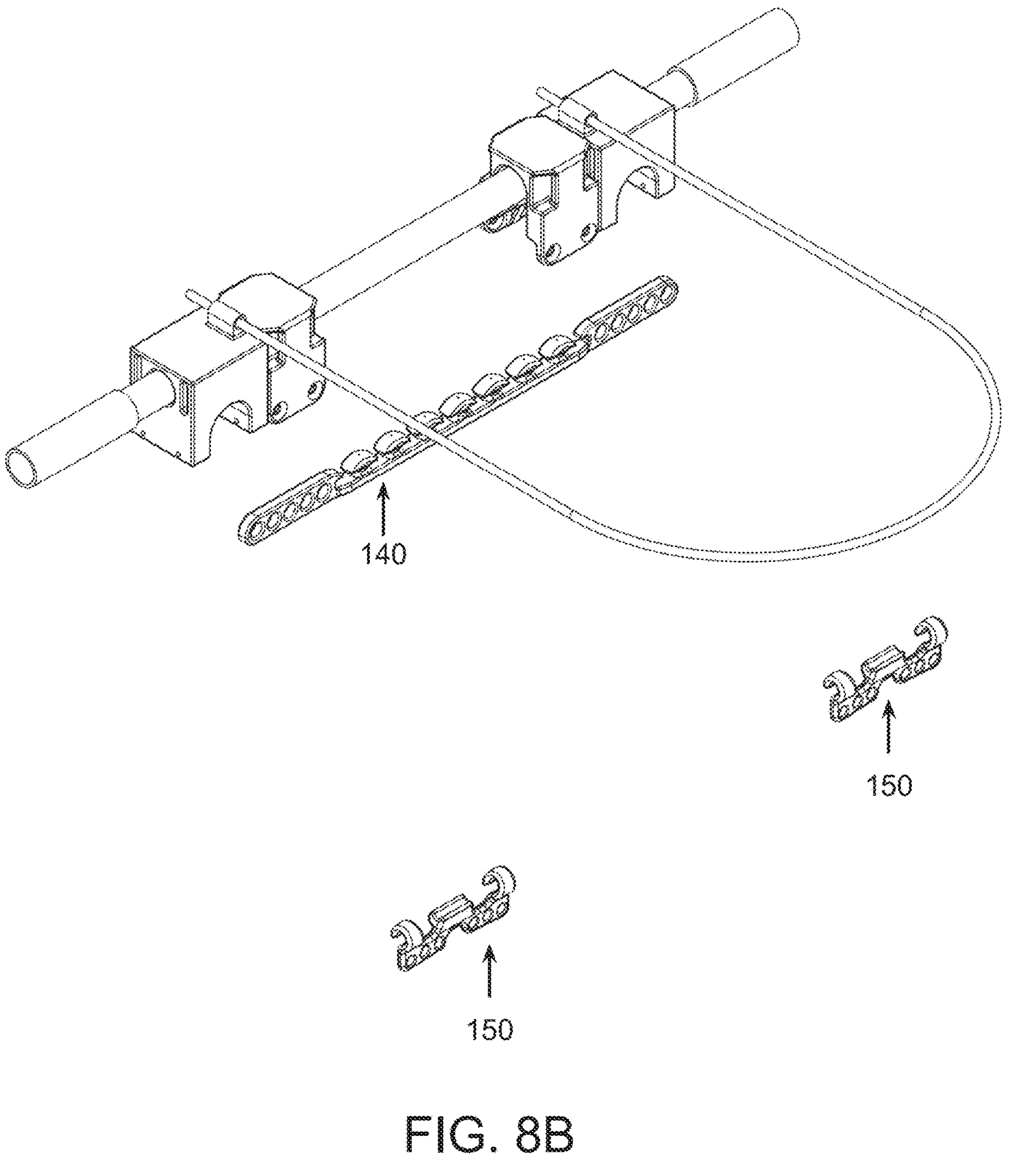
Figure 8C:
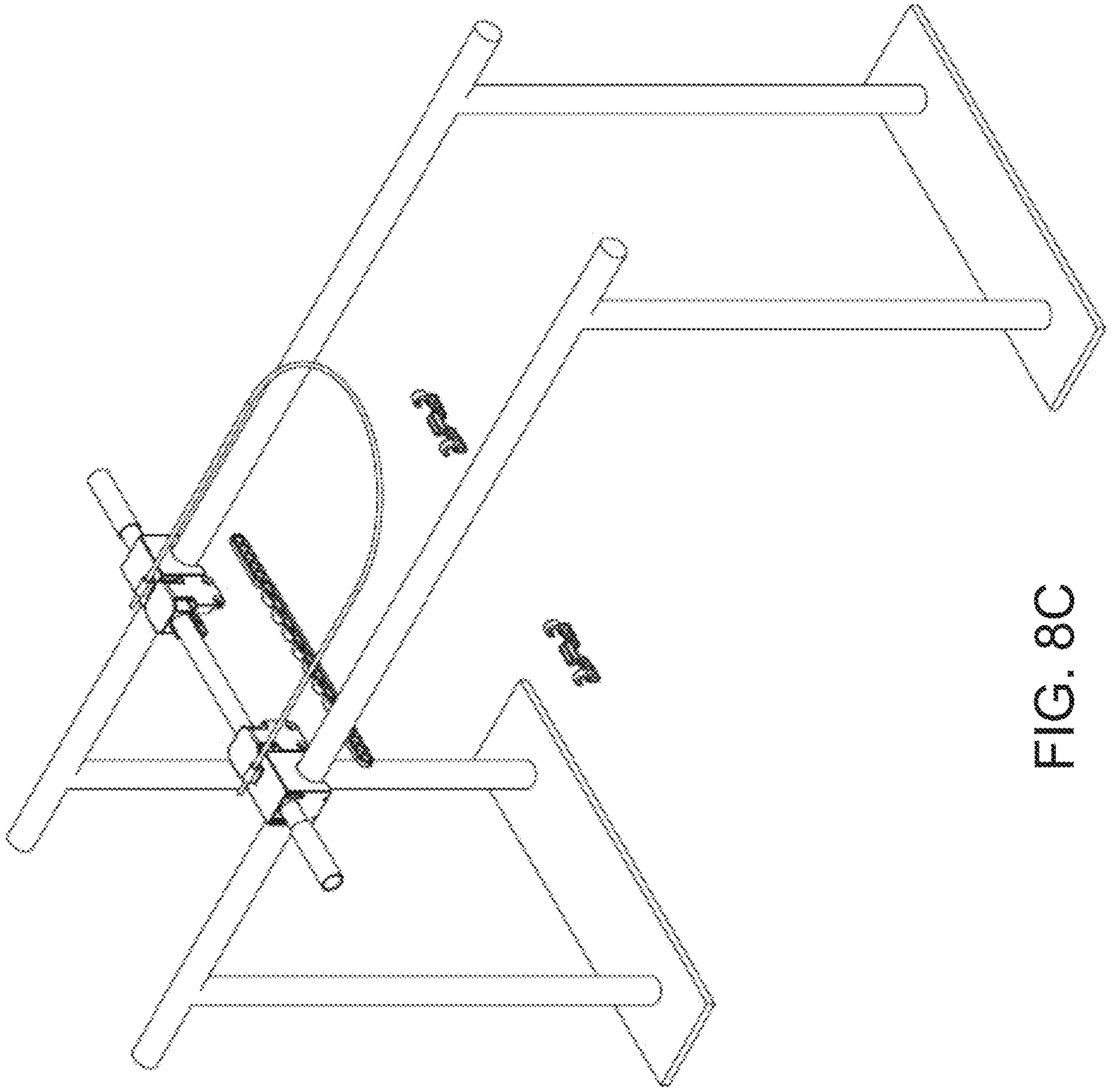

Referring to FIGS. 6A and 6B, in some embodiments, the coupling system may comprise two glider brackets (170), each slidably coupled to one of the parallel bars, and a pole component (180) disposed between the parallel bars and coupled to the glider brackets (170). In some embodiments, the limb assistance device (100) is coupled to the pole component (180). Referring to FIG. 7A-7E, in some embodiments, the coupling system may further comprise a spacer component (190) attached to the glider brackets (170).

Figure 5A:
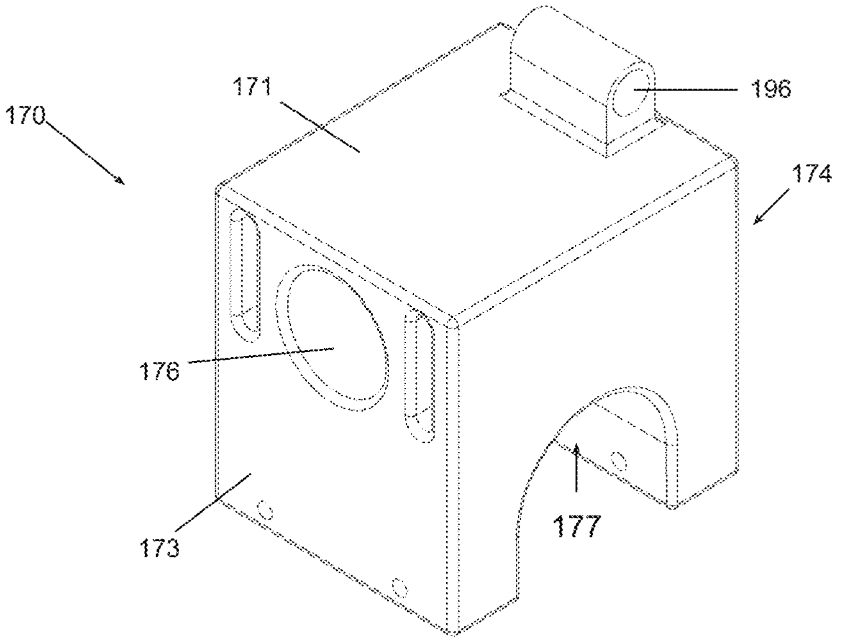
FIG. 5A-5F show several embodiments of the glider brackets described herein.
Figure 5B:
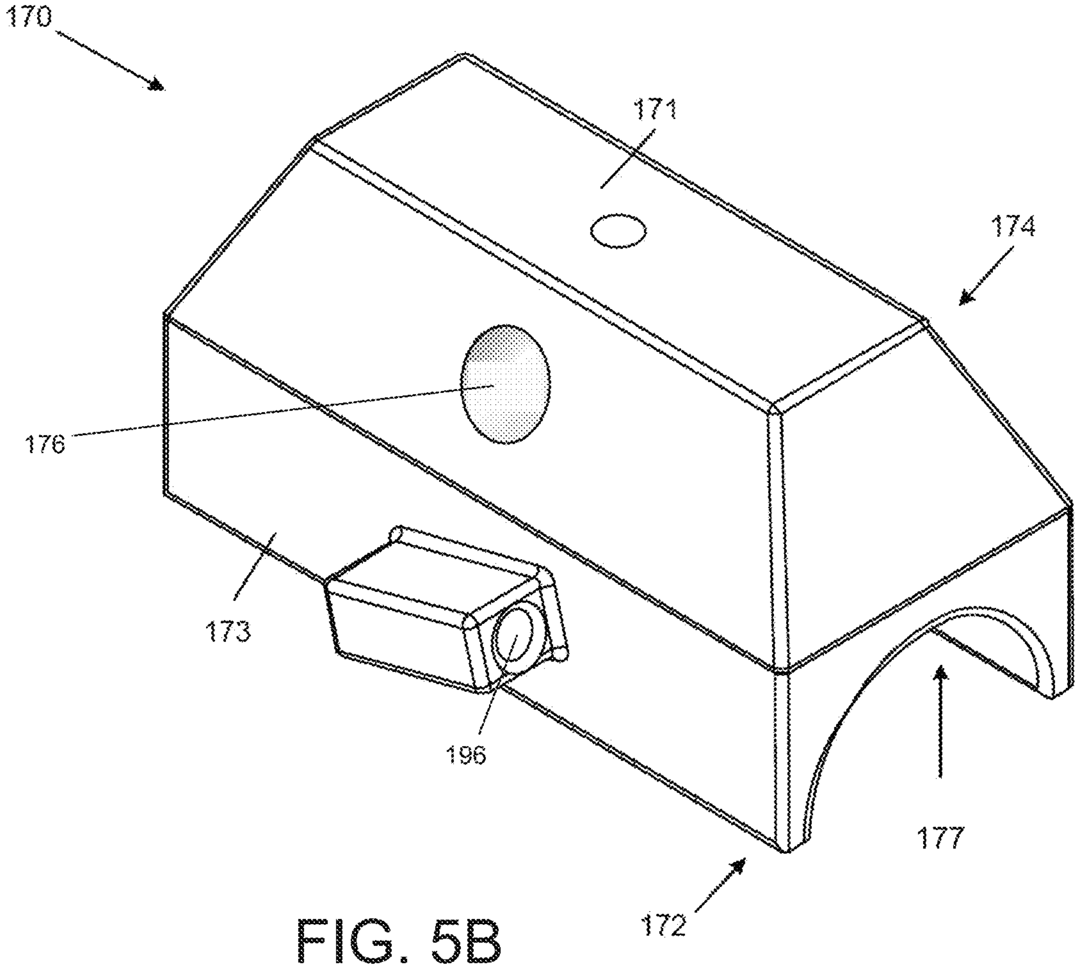
Figure 5C:
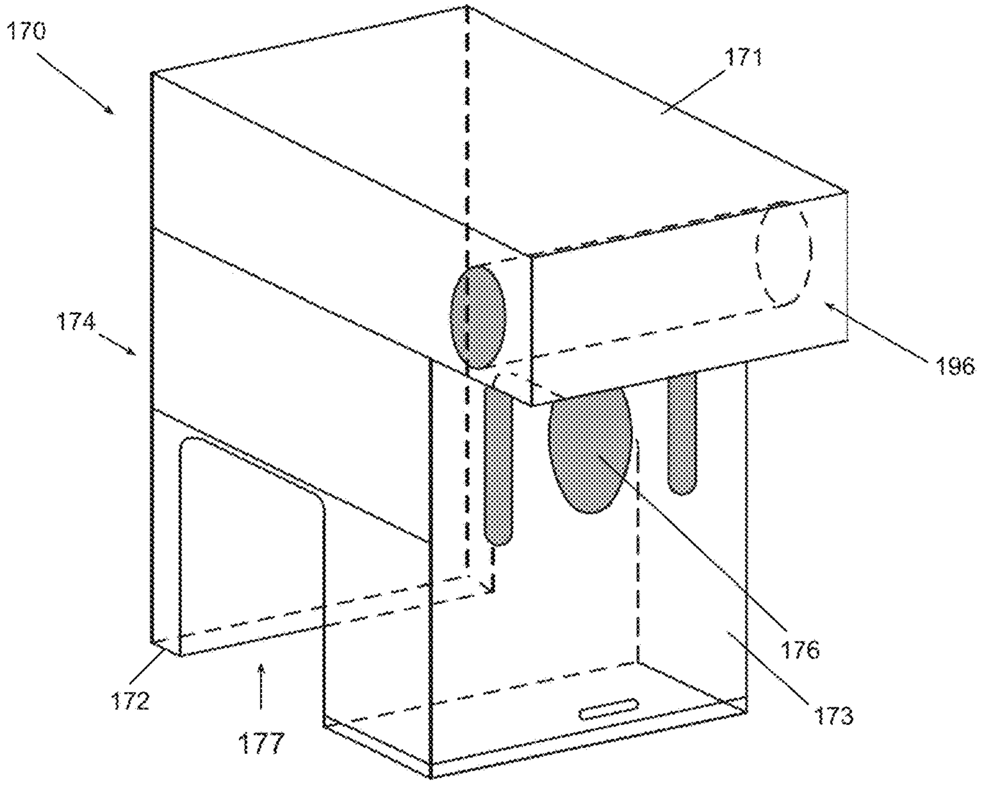
Figure 5D:
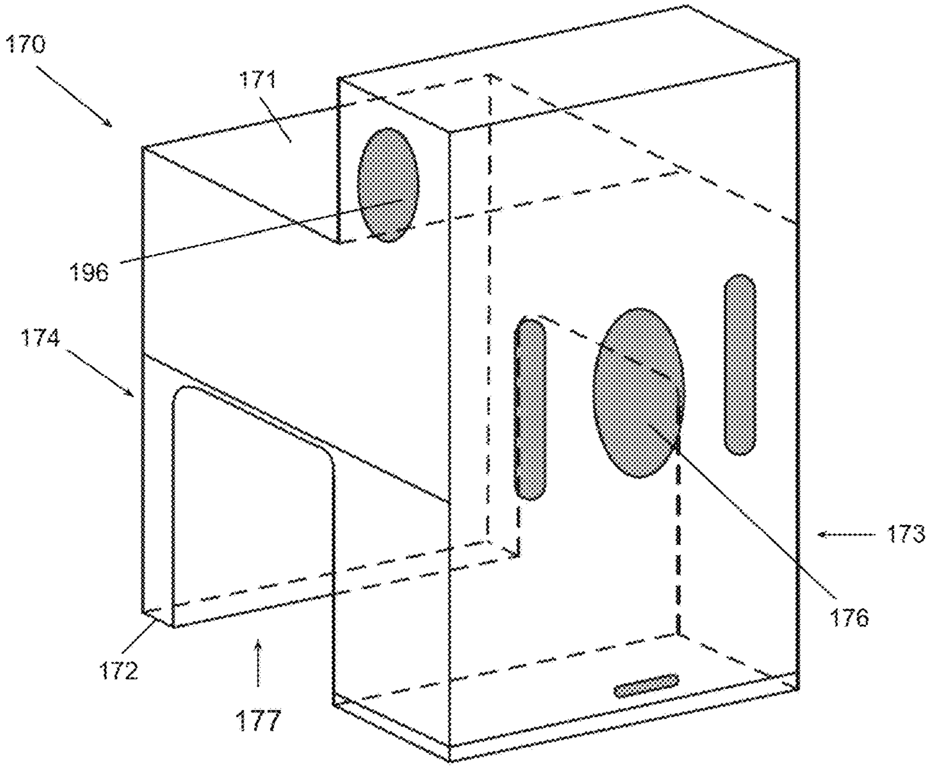
Figure 5E:
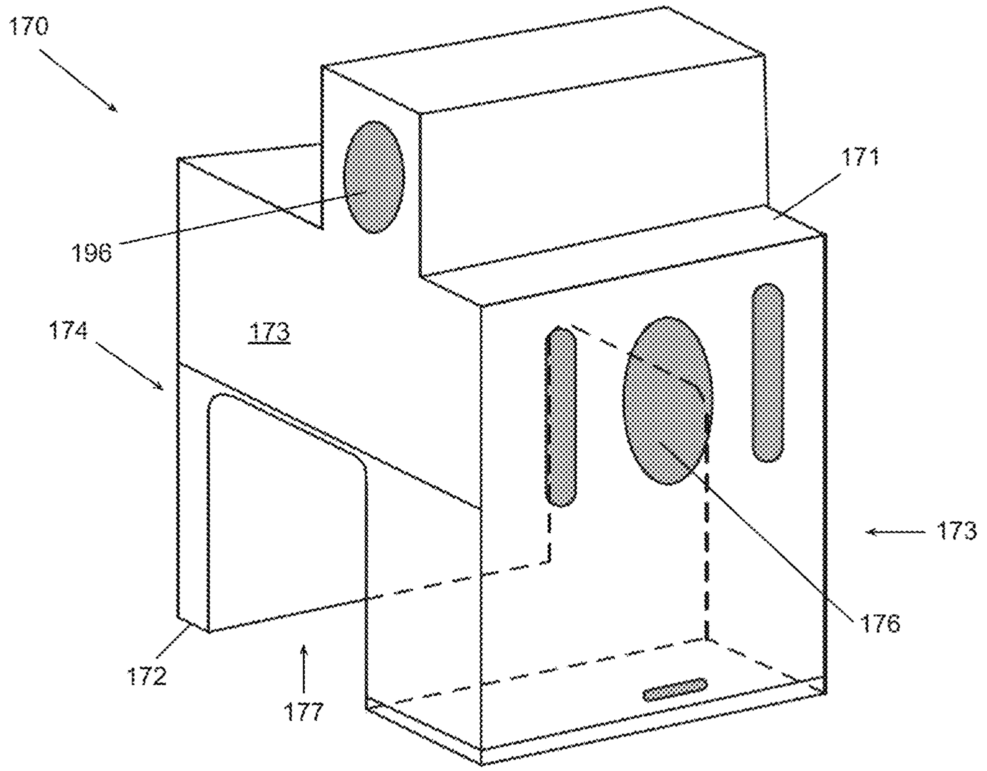

In some embodiments, each of the two glider brackets (170) comprises a first side (171), a second side (172) opposite to the first side (171), a third side (173), and a fourth side (174) opposite to the third side (173). In some embodiments, the second side (172) comprises a concave surface (177). In some embodiments, the concave surface (177) is rounded (see FIGS. 5A and 5B). In other embodiments, the concave surface (177) is squared (see FIG. 5C-5F). The concave surface (177) allows for the attachment of the glider bracket (170) to the stability aid (e.g., the parallel bars). For example, the concave surface (177) allows for the attachment of each of the two glider brackets (170) to the stability aid (e.g., the parallel bars). In some embodiments, the concave surface (177) of the glider bracket (170) is slidably coupled to one of the parallel bars.

Figure 5F:
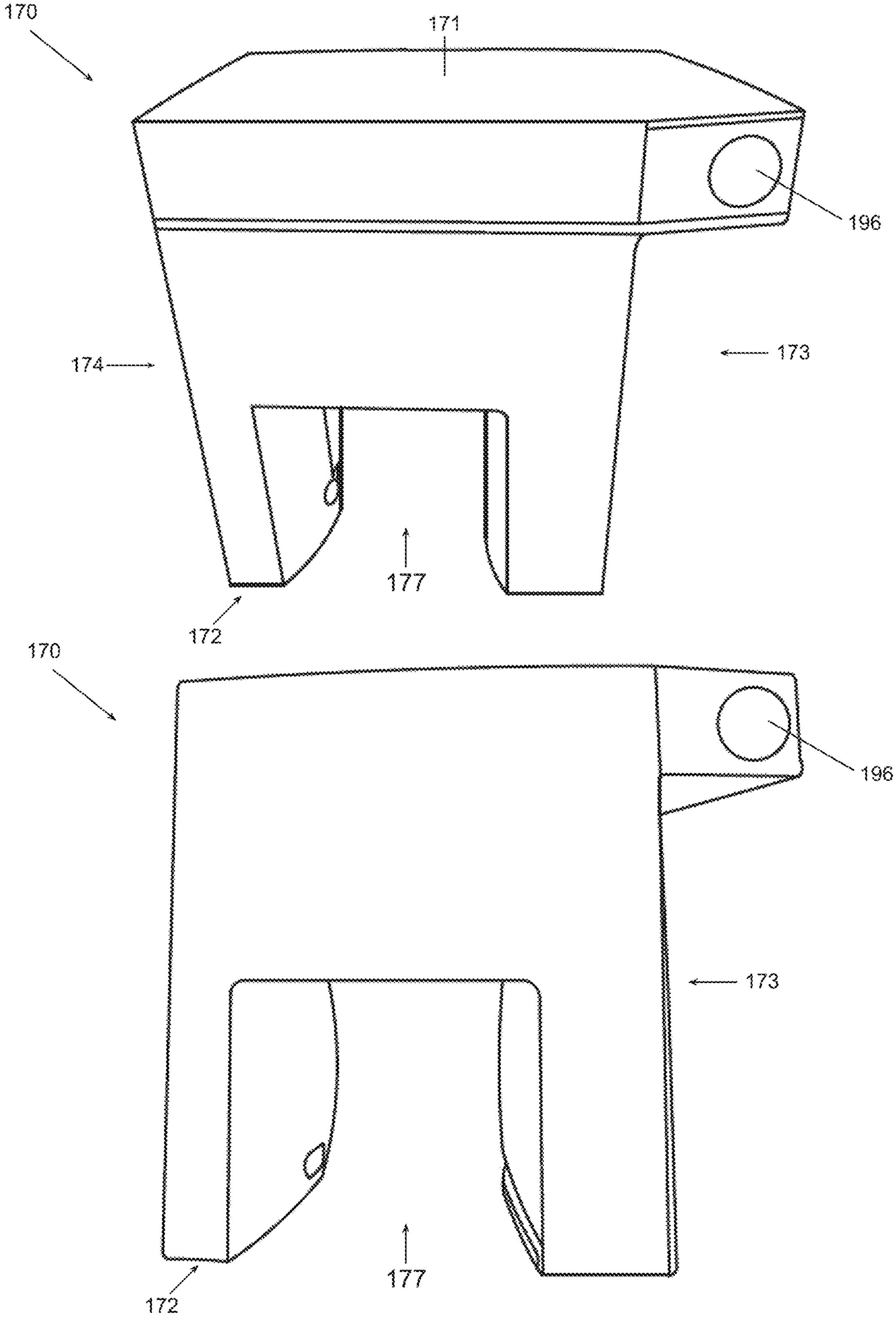

In some embodiments, the concave surface (177) may further comprise convexed sides, e.g., the sides of the concave surface (177) parallel to the third side (173) and the fourth side (174) may be convexed, see FIG. 5F.

In some embodiments, each of the two glider brackets (170) further comprises a cavity (176). In some embodiments, the cavity (176) is disposed at or near the first side (171) and on the third side (173) of the glider bracket (170). In other embodiments, the cavity (176) is disposed at or near the second side (172) and on the third side (173) of the glider bracket (170). In further embodiments, the cavity (176) is disposed between the first side (171) and the second side (172) on the third side (173) of the glider bracket (170). In some embodiments, the cavity (176) is disposed through the third side (173) to the fourth side (174) of the glider bracket (170).

The cavity (176) of each of the two glider brackets (170) may be configured to accept the pole component (180). In some embodiments, the cavity (176) may be configured to accept a pole component (180) such that the pole component (180) is perpendicularly aligned with the parallel bars.

The adaptor brackets (110) of the limb assistance device (100) may be configured to be attached to the pole component (180) of the coupling system. For example, the concave surface (117) of the adaptor bracket (110) allows for the attachment of the adaptor bracket (110) to the pole component (180).

In some embodiments, the glider brackets (170) may have one-way directional capabilities. Without wishing to limit the present invention to any theories or mechanisms, it is believed that the glider brackets (170) with one-way directional capabilities prevent unwanted "backsliding" of the limb assistance device and/or limb assistance system toward the user, i.e., to prevent the limb assistance device and/or limb assistance system from moving in a direction towards the user.

The coupling system may further comprise a spacer component (190). In some embodiments, the spacer component (190) attaches at or near the second side (172) of the glider bracket (170). In some embodiments, the spacer component (190) attaches at or near the first side (171) of the glider bracket (170). In some embodiments, the spacer component (190) attaches between the first side (171) and the second side (172) of the glider bracket (170). In some embodiments, the spacer component (190) attaches to the first side (171) of the glider bracket (170). In some embodiments, the spacer component (190) attaches to the second side (172) of the glider bracket (170). In some embodiments, the spacer component (190) is attached at, near, or on the third side (173) of the glider bracket (170). For example, the spacer component (190) may attach at or near the second side (172) and on the third side (173) of the glider bracket (170), or the spacer component (190) may attach at or near the first side (171) and on the third side (173) of the glider bracket (170). In some embodiments, the spacer component (190) is attached at, near, or on the fourth side (174) of the glider bracket (170).

In some embodiments, the glider bracket (170) further comprises an additional cavity (196) configured to accept the spacer component (190). In some embodiments, the cavity (196) is disposed at or near the first side (171) and on the third side (173) of the glider bracket (170). In other embodiments, the cavity (196) is disposed at or near the second side (172) of the glider bracket (170). In some embodiments, the cavity (196) is disposed between the first side (171) and the second side (172) of the glider bracket (170). In some embodiments, the cavity (196) is disposed on the first side (171) of the glider bracket (170; see FIG. 5A or FIG. 5D). In other embodiments, the cavity (196) is centrally disposed on the first side (171) of the glider bracket (170; see FIG. 5E). In some embodiments, the cavity (196) is disposed on the second side (172) of the glider bracket (170). In some embodiments, the cavity (196) is disposed at, near, or on the third side (173) of the glider bracket (170). For example, the cavity (196) may be disposed at or near the second side (172) and on the third side (173) of the glider bracket (170; see FIG. 5B), or the cavity (196) may attach at or near the first side (171) and on the third side (173) of the glider bracket (170; see FIG. 5C or 5F). In other embodiments, the cavity (196) is disposed at, near, or on the fourth side (174) of the glider bracket (170).

In some embodiments, the spacer component (190) is configured to maintain a set distance between a user and the limb assistance device (100). The space component (190) may be attached to the glider bracket (170) at a variable and/or adjustable angle and distance to maintain optimal mobility patterns for the patient or person in the parallel bars.

EMBODIMENTS

The following embodiments are intended to be illustrative only and not to be limiting in any way.

Embodiment 1: A limb assistance device (100) for assisting in the movement of lower limbs, the device (100) comprising: a) one or more adaptor brackets (110) configured to be attached to a stability aid; b) an elastic cord (130) coupled to the one or more adaptor brackets (110); and c) an intermediate component (140) attached to the elastic cord (130), wherein the intermediate component (140) allows for the adjustment of the elastic cord (130) to compensate for a gait pattern of a user; wherein the elastic cord (130) comprises an attachment component (160) for attaching the limb assisting device (100) to a foot or shoe of the user.

Embodiment 2: The limb assistance device (100) of embodiment 1, comprising two adaptor brackets (110).

Embodiment 3: The limb assistance device (100) of embodiment 1 or embodiment 2, wherein each of the one or more adaptor brackets (110) comprises a first side (111), a second side (112), a third side (113), and a fourth side (114), wherein the one or more adaptor brackets (110) are attached to the stability aid via a bracket attachment component (118) disposed on the one or more adaptor brackets (110).

Embodiment 4: The limb assistance device (100) of any one of embodiments 1-3, wherein the intermediate component (140) comprises a first end (141), a second end (141), and a plurality of notches (145).

Embodiment 5: The limb assistance device (100) of embodiment 4, wherein the elastic cord (130) is disposed through at least two notches of the plurality of notches (145) of the intermediate component (140).

Embodiment 6: The limb assistance device (100) of embodiment 4 or 5, wherein the intermediate component (145) is attached to at least one of the adaptor brackets (110).

Embodiment 7: The limb assistance device (100) of any one of embodiments 4-6, wherein the intermediate component (140) is attached to two adaptor brackets (110), wherein the first end (141) of the intermediate component (140) is attached to a first adaptor bracket (110*a*), and the second end (142) of the intermediate component (140) is attached to a second adaptor bracket (110*b*).

Embodiment 8: The limb assistance device (100) of any one of embodiments 4-7, wherein the elastic cord (130) is coupled to the one or more adaptor brackets (110) via the intermediate component (140), wherein a first end (131) of the elastic cord (130) attaches to the first end (141) of the intermediate component (140) and a second end (132) of the elastic cord (130) attaches to the second end (142) of the intermediate component (142).

Embodiment 9: The limb assistance device (100) of any one of embodiments 4-7, wherein a first end (131) of the elastic cord (130) attaches to a first adaptor brackets (110*a*), and a second end (132) of the elastic cord (130) attaches to a second bracket (110*b*).

Embodiment 10: The limb assistance device (100) of any one of embodiments 1-9, further comprising at least one reciprocating component (150) comprising a first end (151) and a second end (152), wherein the reciprocating component (150) is slidably connected to the elastic cord (130).

Embodiment 11: The limb assistance device (100) of any one of embodiments 1-9, further comprising two reciprocating components (150), each comprising a first end (151) and a second end (152), wherein the first end (151) of each of the reciprocating components (150) is slidably connected to the elastic cord (130).

Embodiment 12: The limb assistance device (100) of embodiment 10 or embodiment 11, wherein the attachment component (160) is disposed on the second end (152) of the reciprocating component (150), wherein the attachment component (160) is configured to attach to a foot, a shoe, a brace, or other pieces of footwear of the user.

Embodiment 13: The limb assistance device (100) of any one of embodiments 1-12, wherein the stability aid comprises a walker.

Embodiment 14: The limb assistance device (100) of any one of embodiments 1-12, wherein the stability aid comprises parallel bars.

Embodiment 15: A limb assistance system comprising a limb assistance device (100) according to any one of embodiments 1-14, and a stability aid to which the limb assistance device (100) is attached thereto, wherein the stability aid is a walker, wherein the one or more adaptor brackets (110) is attached to the walker.

Embodiment 16: A limb assistance system comprising: a) a limb assistance device (100) according to any one of embodiment 1-14; b) a pair of parallel bars; and c) a coupling system for connecting the limb assistance device (100) to the parallel bars.

Embodiment 17: The system of embodiment 16, wherein the coupling system comprises: a) two glider brackets (170), each slidably coupled to one of the parallel bars; and b) a pole component (180) disposed between the parallel bars and coupled to the glider brackets (170); wherein the limb assistance device (100) is coupled to the pole component (180).

Embodiment 18: The limb assistance system of embodiment 17 wherein each of the two glider brackets (170) comprises a first side (171), a second side (172) opposite to the first side (171), a third side (173), and a fourth side (174) opposite to the third side (173), wherein the second side (172) comprises a concave surface (175).

Embodiment 19: The limb assistance device (100) of embodiment 18, wherein the concave surface (175) of the glider brackets (170) is slidably coupled to one of the parallel bars.

Embodiment 20: The limb assistance system of any one of embodiments 17-19, wherein the glider bracket (170) further comprises a cavity (176) disposed on the third side (173) of the glider bracket (170).

Embodiment 21: The limb assistance system of embodiments 20, wherein the cavity (176) is disposed through the third side (173) to the fourth side (174) of the glider bracket (170).

Embodiment 22: The limb assistance system of embodiment 20 or embodiment 21, wherein the cavity (176) is configured to accept the pole component (180), wherein the pole component (180) is perpendicularly aligned with the parallel bars.

Embodiment 23: The limb assistance system of any one of embodiments 17-22, further comprising a spacer component (190).

Embodiment 24: The limb assistance system of embodiment 23, wherein the spacer component (190) attaches to the third side (173) of the glider bracket (170).

Embodiment 25: The limb assistance device (100) of embodiment 24, wherein the spacer component (190) is configured to maintain a set distance between a user and the limb assistance device (100).

Embodiment 26: The limb assistance device (100) of any one of embodiments 1-25, wherein when the adaptor brackets (110) are moved out of line with the reciprocating component (150), tension is placed on the elastic cord (130) which allows the reciprocating component (150) to move back into a coplanar position with the two adaptor brackets (110).

Embodiment 27: A limb assistance device (100) for assisting in the movement of lower limbs, the device (100) comprising: a) two adaptor brackets (110), each bracket (110) comprising a first side (111), a second side (112) opposite to the first side (111), a third side (113), and a fourth side (114) opposite to the third side (113), wherein the second side (112) comprises a concave surface (117), b) an intermediate component (140) comprising a first end (141), a second end (141), and a plurality of notches (145), wherein the intermediate component (145) is attached to at least one of the two adaptor brackets (110); c) an elastic cord (130) operatively connected to the plurality of notches (145) on the intermediate component (140); d) at least one reciprocating component (150) comprising a first end (151) and a second end (152), wherein the reciprocating component (150) is slidably connected to the elastic cord (130); and e) at least one attachment component (160) disposed on the second end (152) of the reciprocating component (150); wherein the attachment component (160) is configured to attach to a shoe or a foot of a user.

Embodiment 28: The device of embodiment 27, further comprising at least two connector components (120) attached to each of the adaptor brackets (110).

Embodiment 29: The device of embodiment 27 or embodiment 28, wherein each of the two adaptor brackets (110) further comprises a bracket attachment component (118) disposed at or near the first side (111) of the adaptor bracket (110).

Embodiment 30: The device of embodiment 29, wherein the bracket attachment component (118) is configured to attach the limb assistance device (100) to a stability aid.

Embodiment 31: The device of any one of embodiments 27-30, wherein the intermediate component (140) is attached to each of the adaptor brackets (110); wherein a first end (141) of the intermediate component (140) is attached to a first adapter bracket (110), and a second end (142) of the intermediate component (140) is attached to a second adaptor bracket (110).

Embodiment 32: The device of any one of embodiments 28-30, wherein the intermediate component (140) is attached to each of the connector components (120)

attached; wherein a first end (141) of the intermediate component (140) is attached to a first connector component (120), and a second end (142) of the intermediate component (140) is attached to a second connector component (120).

Embodiment 33: The device of any one of embodiments 27-32, wherein a first end (131) of the elastic cord (130) attaches to the first end (141) of the intermediate component (140) and a second end (132) of the elastic cord (130) attaches to the second end (142) of the intermediate component (140).

Embodiment 34: The device of any one of embodiments 27-33, wherein a first end (131) of the elastic cord (130) attaches to a first connector component (120), and a second end (132) of the elastic cord (130) attaches to a second connector component (120).

Embodiment 35: The device of any one of embodiments 27-34, wherein the device comprises two reciprocating components (150), each slidably connected to the elastic cord (130).

Embodiment 36: The device of any one of embodiments 27-34, wherein the stability aid comprises a walker.

Embodiment 37: The device of any one of embodiments 27-34, wherein the stability aid comprises parallel bars.

Embodiment 38: A limb assistance system comprising a limb assistance device (100) according to any one of embodiments 27-37, and a stability aid to which the limb assistance device (100) is attached thereto, wherein the stability aid is a walker, wherein the two adaptor brackets (110) are attached to the walker.

Embodiment 39: A limb assistance system comprising: a) a limb assistance device (100) according to any one of embodiment 27-37; b) a pair of parallel bars; and c) a coupling system for connecting the limb assistance device (100) to the parallel bars.

Embodiment 40: The system of embodiment 39 wherein the coupling system comprises: a) two glider brackets (170), each slidably coupled to one of the parallel bars; and b) a pole component (180) disposed between the parallel bars and coupled to the glider brackets (170); wherein the limb assistance device (100) is coupled to the pole component (180).

Embodiment 41: The limb assistance system of embodiment 40 wherein each of the two glider brackets (170) comprises a first side (171), a second side (172) opposite to the first side (171), a third side (173), and a fourth side (174) opposite to the third side (173), wherein the second side (172) comprises a concave surface (175).

Embodiment 42: The limb assistance device (100) of embodiment 41, wherein the concave surface (175) of the glider brackets (170) is slidably coupled to one of the parallel bars.

Embodiment 43: The limb assistance system of any one of embodiments 40-42, wherein the glider bracket (170) further comprises a cavity (176) disposed on the third side (173) of the glider bracket (170).

Embodiment 44: The limb assistance system of embodiments 43, wherein the cavity (176) is disposed through the third side (173) to the fourth side (174) of the glider bracket (170).

Embodiment 45: The limb assistance system of embodiment 43 or embodiment 44, wherein the cavity (176) is configured to accept the pole component (180), wherein the pole component (180) is perpendicularly aligned with the parallel bars.

Embodiment 46: The limb assistance system of any one of embodiments 40-45, further comprising a spacer component (190).

Embodiment 47: The limb assistance system of embodiment 46, wherein the spacer component (190) attaches to the third side (173) of the glider bracket (170).

Embodiment 48: The limb assistance device (100) of embodiment 46 or embodiment 47, wherein the spacer component (190) is configured to maintain a set distance between a user and the limb assistance device (100).

Embodiment 49: The limb assistance device (100) of any one of embodiments 27-48, wherein when the two adaptor brackets (110) are moved out of line with the reciprocating component (150), tension is placed on the elastic cord (130), which allows the reciprocating component (150) to move back into a coplanar position with the two adaptor brackets (110).

Embodiment 50: A limb assistance device (100) for assisting in the movement of lower limbs, the device (100) comprising: a) two adaptor brackets (110) configured to be attached to a stability aid; b) an elastic cord (130) coupled to the one or more adaptor brackets (110); and c) an intermediate component (140) attached to the elastic cord (130), wherein the intermediate component (140) allows for the adjustment of the elastic cord (130) to compensate for a gait pattern of a user; wherein the elastic cord (130) comprises an attachment component (160) for attaching the limb assisting device (100) to a shoe, brace, foot of the user.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only, and the claims are not limited by the dimensions of the figures. In some embodiments, descriptions of the inventions described herein using the phrase "comprising" includes embodiments that could be described as "consisting essentially of" or "consisting of", and as such, the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A limb assistance device (100) for assisting in movement of lower limbs of a user, the device (100) comprising:

a) a first adaptor bracket (110*a*) and a second adaptor bracket (110*b*) each configured to be attached to a stability aid;

b) an intermediate component (140) comprising a first end (141), a second end (142) and a plurality of notches (145), wherein the first end (141) of the intermediate component (140) attaches to the first adaptor bracket (110*a*) and the second end (142) of the intermediate component (140) attaches to the second adaptor bracket (110*b*); and c) an elastic cord (130) coupled to the intermediate component (140), wherein the elastic cord (130) comprises an attachment component (160) for attaching the limb assisting device (100) to the user;

wherein the intermediate component (140) allows for adjustment of the elastic cord (130).

2. The limb assistance device (100) of claim 1, wherein each of the adaptor brackets (110) comprises a first side (111), a second side (112) opposite to the first side (111), a third side (113), and a fourth side (114) opposite to the third side (113), wherein the second side (112) comprises a concave surface (117), wherein each of the adaptor brackets (110) is attached to the stability aid via a bracket attachment component (118) disposed on the adaptor brackets (110).

3. The limb assistance device (100) of claim 1, wherein the elastic cord (130) is disposed through at least two notches of the plurality of notches (145) of the intermediate component (140).

4. The limb assistance device (100) of claim 1, wherein a first end (131) of the elastic cord (130) attaches to the first end (141) of the intermediate component (140) and a second end (132) of the elastic cord (130) attaches to the second end (142) of the intermediate component (142).

5. The limb assistance device (100) of claim 1, further comprising at least one reciprocating component (150) comprising a first end (151) and a second end (152), wherein the reciprocating component (150) is slidably connected to the elastic cord (130), wherein the attachment component (160) is disposed on the second end (152) of the reciprocating component (150).

6. The limb assistance device (100) of claim 1, further comprising two reciprocating components (150), each comprising a first end (151) and a second end (152), wherein the first end (151) of each of the reciprocating components (150) is slidably connected to the elastic cord (130), wherein the attachment component (160) is disposed on the second end (152) of each of the two reciprocating components (150).

7. The limb assistance device (100) of claim 1, wherein the attachment component (160) is configured to attach to a foot, a shoe, a brace, or another piece of footwear of the user.

8. The limb assistance device (100) of claim 1, wherein the stability aid comprises a walker.

9. The limb assistance device (100) of claim 1, wherein the stability aid comprises parallel bars.

10. A limb assistance system comprising the limb assistance device (100) according to claim 1, and a stability aid to which the limb assistance device (100) is attached thereto, wherein the stability aid is a walker, wherein the two adaptor brackets (110) are attached to the walker.

11. A limb assistance system comprising:

a) the limb assistance device (100) according to claim 1;

b) a pair of parallel bars; and c) a coupling system for connecting the limb assistance device (100) to the parallel bars.

12. The limb assistance system of claim 11, wherein the coupling system comprises:

a) two glider brackets (170), each slidably coupled to one of the parallel bars; and b) a pole component (180) disposed between the parallel bars and coupled to the glider brackets (170); and wherein the limb assistance device (100) is coupled to the pole component (180).

13. The limb assistance system of claim 12, further comprising a spacer component (190), wherein the spacer component (190) attaches to the glider brackets (170), wherein the spacer component (190) is configured to maintain a set distance between the user and the limb assistance device (100).

14. The limb assistance system of claim 12, wherein the glider brackets (170) comprise a first side (171), a second side (172) opposite to the first side (171), a third side (173), and a fourth side (174) opposite to the third side (173), wherein the second side (172) comprises a concave surface (177), wherein the concave surface (177) of the glider brackets (170) is slidably coupled to one of the parallel bars.

15. The limb assistance system of claim 14, wherein the glider brackets (170) further comprise a cavity (176) disposed at or near the first side (171) and on the third side (173) of the glider bracket (170), wherein the cavity (176) is configured to accept the pole component (180), wherein the pole component (180) is perpendicularly aligned with the parallel bars.

16. The limb assistance device (100) of claim 1, wherein when the two adaptor brackets (110) are moved out of line with the attachment component (160), tension is placed on the elastic cord (130), which allows the attachment component (160) to realign with the two adaptor brackets (110).

* * * * *